US008449392B2

(12) United States Patent
Furuta et al.

(10) Patent No.: US 8,449,392 B2
(45) Date of Patent: May 28, 2013

(54) STORAGE MEDIUM HAVING GAME PROGRAM STORED THEREIN, GAME APPARATUS, CONTROL METHOD, AND GAME SYSTEM USING A HEARTBEAT FOR PERFORMING A GAME PROCESS IN A VIRTUAL GAME WORLD

(75) Inventors: Norikatsu Furuta, Kyoto (JP); Makoto Yoshizawa, Sendai (JP); Norihiro Sugita, Sendai (JP); Tomoyuki Yambe, Sendai (JP); Goro Abe, Kyoto (JP)

(73) Assignees: Nintendo Co., Ltd., Kyoto (JP); Tohoku University, Miyagi (JP)

( * ) Notice: Subject to any disclaimer, the term of this patent is extended or adjusted under 35 U.S.C. 154(b) by 191 days.

(21) Appl. No.: 12/760,010

(22) Filed: Apr. 14, 2010

(65) Prior Publication Data

US 2011/0183757 A1 Jul. 28, 2011

(30) Foreign Application Priority Data

Jan. 22, 2010 (JP) ................................. 2010-012500

(51) Int. Cl.
*A63F 9/24* (2006.01)
(52) U.S. Cl.
USPC .................................. 463/36; 463/37; 463/38
(58) Field of Classification Search
USPC .................................................... 463/36–38
See application file for complete search history.

(56) References Cited

U.S. PATENT DOCUMENTS

| 5,860,860 A * | 1/1999 | Clayman .......................... 463/36 |
| 2007/0149282 A1 * | 6/2007 | Lu et al. ........................... 463/36 |
| 2008/0227546 A1 * | 9/2008 | Roberts ............................ 463/38 |
| 2008/0275358 A1 * | 11/2008 | Freer et al. ...................... 600/544 |
| 2010/0069780 A1 * | 3/2010 | Schuette et al. ............... 600/547 |
| 2011/0034248 A1 * | 2/2011 | Grever et al. ................... 463/36 |
| 2011/0212782 A1 * | 9/2011 | Thompson et al. ............. 463/40 |

FOREIGN PATENT DOCUMENTS

JP 11-47448 2/1999

OTHER PUBLICATIONS

Eliza Strickland, Mind-Controlled Video Game Gets a Tryout in Japan, Oct. 9, 2008, http://blogs.discovermagazine.com/80beats/2008/10/09/mind-controlled-video-game-gets-a-tryout-in-japan/.*
Wikia Gaming, Atomic Fire, Aug. 28, 2008, http://megaman.wikia.com/wiki/Atomic_Fire.*
Jeremy Stone, Mega Man II Guide, May 26, 2008, http://faqsmovies.ign.com/faqs/document/article/876/876595/lockex007_megaman2_2008may26.pdf.*
Ville Nenonen, Using Heart Rate to Control an Interactive Game, Apr. 28, 2007.*
Dean Takahashi, Nintendo CEO: Wii care about your heartbeat, but not your iPhone, the recession or free games, Jun. 4, 2009, http://venturebeat.com/2009/06/04/nintendo-ceo-wii-care-about-your-heartbeat-but-not-your-iphone-the-recession-or-freegames/.*
Robin Cooper, Using finger-toe pulse oximetry to assess arterial blood flow, Nursing Times.net, vol. 101, Issue: 46, p. 47, Nov. 15, 2005, http://www.nursingtimes.net/nursing-practice-clinical-research/using-finger-toe-pulse-oximetry-to-assess-arterial-blood-flow/203535.article.*

* cited by examiner

*Primary Examiner* — Dmitry Suhol
*Assistant Examiner* — Jason Yen
(74) *Attorney, Agent, or Firm* — Nixon & Vanderhye P.C.

(57) ABSTRACT

A player object is caused to perform a motion in a virtual game world in accordance with information corresponding to a biological signal acquired from a player. Biological signal acquisition means acquires the biological signal from the player. Pulse detection means detects pulse or heartbeat of the player in accordance with the biological signal acquired by the biological signal acquisition means. Player object motion control means causes the player object to discharge a discharge object in the virtual game world when the pulse detection means detects the pulse or the heartbeat.

20 Claims, 14 Drawing Sheets

Dc

| HEART RATE H R | NUMBER OF DISCHARGE BULLETS | ATTACK POWER | DISCHARGE DIRECTION |
|---|---|---|---|
| H R < 6 0 | 1 | 1 2 0 | A |
| 6 0 ≦ H R < 6 5 | 2 | 6 0 | B |
| 6 5 ≦ H R < 7 0 | 3 | 4 0 | C |
| 7 0 ≦ H R | 5 | 2 4 | D |

F I G. 1
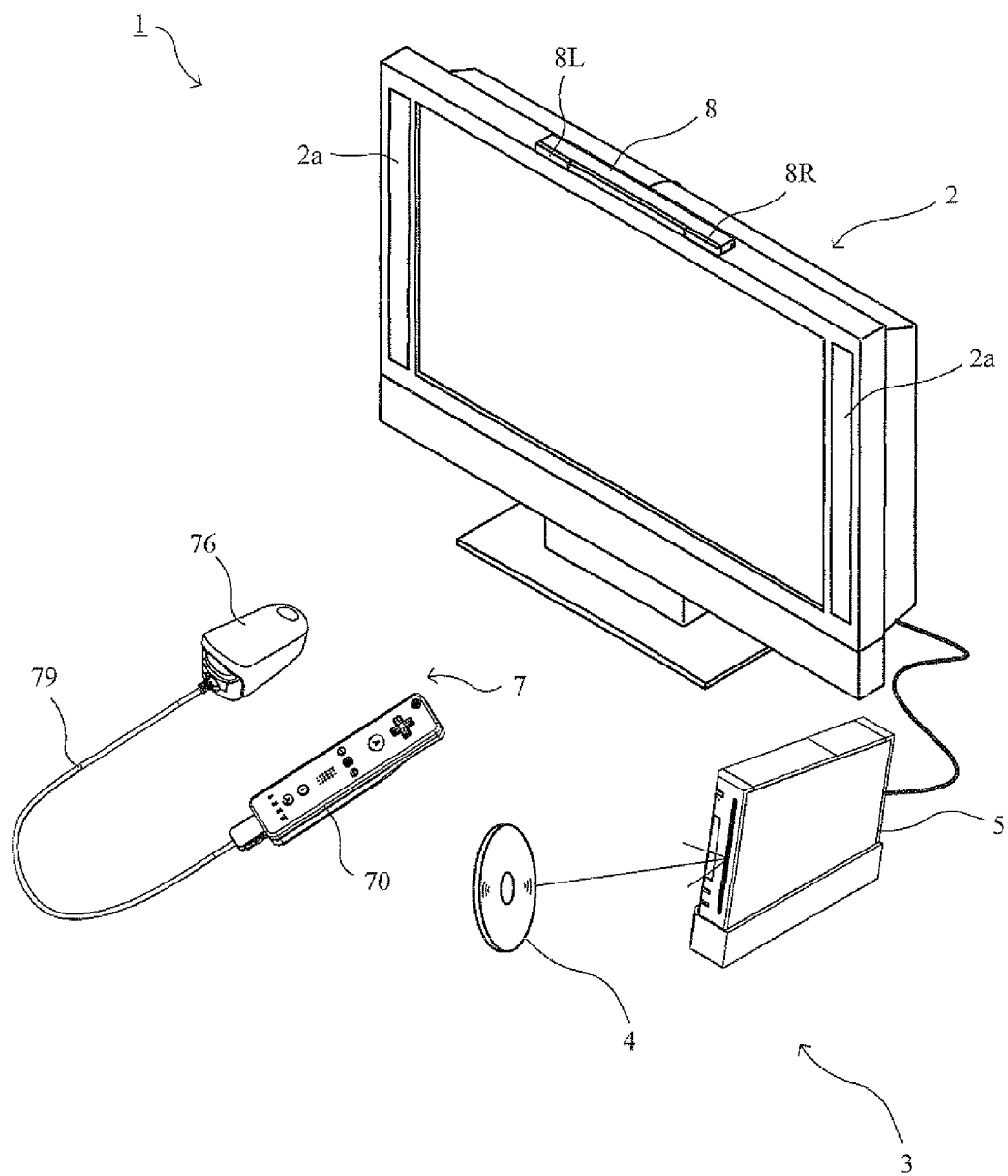

F I G. 4
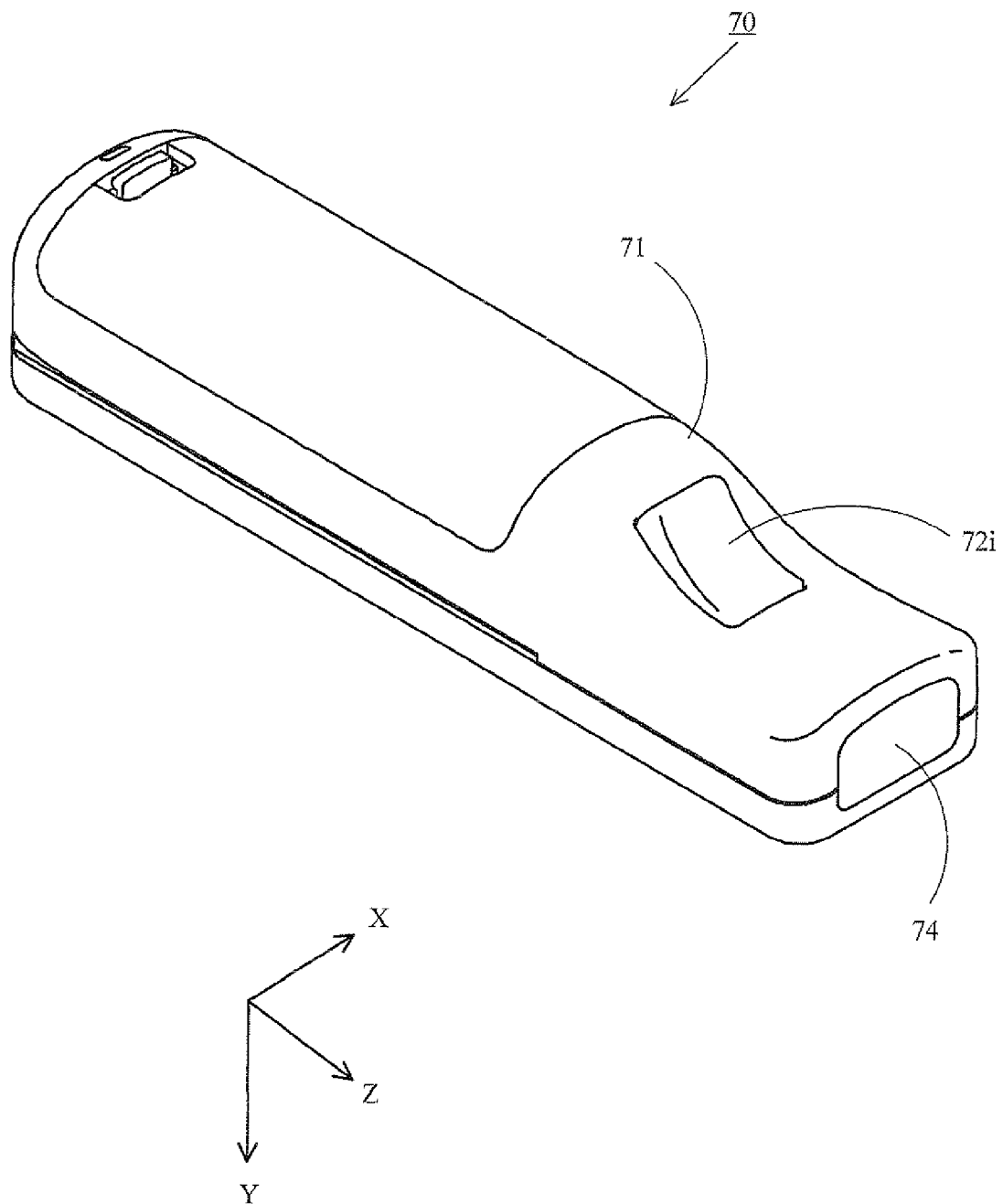

| HEART RATE HR | NUMBER OF DISCHARGE BULLETS | ATTACK POWER | DISCHARGE DIRECTION |
|---|---|---|---|
| HR<60 | 1 | 120 | A |
| 60≦HR<65 | 2 | 60 | B |
| 65≦HR<70 | 3 | 40 | C |
| 70≦HR | 5 | 24 | D |

STORAGE MEDIUM HAVING GAME PROGRAM STORED THEREIN, GAME APPARATUS, CONTROL METHOD, AND GAME SYSTEM USING A HEARTBEAT FOR PERFORMING A GAME PROCESS IN A VIRTUAL GAME WORLD

CROSS REFERENCE TO RELATED APPLICATION

The disclosure of Japanese Patent Application No. 2010-012500, filed Jan. 22, 2010, is incorporated herein by reference.

BACKGROUND OF THE INVENTION

1. Field of the Invention

The present invention relates to a storage medium having a game program stored therein, a game apparatus, a control method, and a game system, and more particularly to a storage medium having a game program stored therein, a game apparatus, a control method, and a game system, which are capable of performing a predetermined game process in accordance with an input by a player.

2. Description of the Background Art

Conventionally, as disclosed in Japanese Laid-Open Patent Publication No. 11-47448 (hereinafter referred to as Patent Document 1), for example, a so-called shooting game is known in which a player character in a virtual game world discharges an object (such as a bullet, a laser beam, and the like) and gains scores when the discharged object hits an enemy character. For example, in the shooting game disclosed in the patent document 1, when the player presses a predetermined button provided on the controller, the player character operated by the player discharges a discharge object. Further, in the shooting game, the player can gain scores when the discharge object hits an other character (e.g., an enemy character) whose motion is controlled by the computer and when the other character disappears from the virtual game world.

However, in the shooting game disclosed in the Patent Document 1, the player operates the player character by using the operation buttons provided on the controller, whereby an object such as a bullet, a laser beam, or the like is discharged in response to pressing of a predetermined operation button. Such an operation is a simple intuitive operation for the player, and lacks in fun.

SUMMARY OF THE INVENTION

Therefore, an object of the present invention is to provide a storage medium having a game program stored therein, a game apparatus, a control method, and a game system, which realizes a highly entertaining operation that cannot be anticipated by the player.

The present invention has the following features to attain the object mentioned above.

A first aspect of the present invention is a computer readable storage medium having stored therein a game program executed by a computer of a game apparatus performing game processing to cause a player object to perform in a virtual game world in accordance with information corresponding to a biological signal acquired from a player. The game program causes the computer to function as biological signal acquisition means, pulse detection means, and player object motion control means. The biological signal acquisition means acquires the biological signal from the player. The pulse detection means detects pulse or heartbeat of the player in accordance with the biological signal acquired by the biological signal acquisition means. The player object motion control means causes the player object to perform a motion of discharging at least one discharge object in the virtual game world when the pulse detection means detects the pulse or the heartbeat.

According to the above, in accordance with the pulse or the heartbeat of the player, at least one discharge object is discharged from the player character. Accordingly, a highly entertaining operation that the player cannot easily anticipate can be realized.

Further, the above game program further may cause the computer to function as interval calculation means. The interval calculation means calculates, based on the biological signal acquired by the biological signal acquisition means, an interval of detection by the pulse detection means of the pulse or the heartbeat of the player. In this case, the player object motion control means may change, in accordance with the interval of detection, a configuration of the at least one discharge object to be discharged when the player object performs one discharging motion.

According to the above, the configuration of the discharge object to be discharged is changed in accordance with the pulse or the heartbeat of the player is changed based on the interval of occurrence of the pulse or the heartbeat of the player. Accordingly, a further highly entertaining operation that the player cannot easily anticipate can be realized.

Further, the above game program may further cause the computer to function as target object motion control means. The target object motion control means causes a target object, which is a target to be hit by a discharge object, to appear in the virtual game world. In this case, when one of the at least one discharge object has hit the target object, the player object motion control means may change, in accordance with the interval of detection, an effect of the one of the at least one discharge object exerted on the target object According to the above, the effect of the discharge object (e.g., attack power against the target object) discharged in accordance with the pulse or the heartbeat of the player, the effect being exerted on the target object, is changed in accordance with the interval of occurrence of the pulse or the heartbeat of the player. Accordingly, a further highly entertaining operation that the player cannot easily anticipate can be realized.

Further, the above player object motion control means may change, in accordance with the interval of detection, the number of the at least one discharge object to be discharged when the player object performs one discharging motion.

According to the above, the number of at least one discharge object discharged at one pulse or heartbeat of the player is changed in accordance with the interval of occurrence of the pulse or the heartbeat of the player. Accordingly, a further highly entertaining operation that the player cannot easily anticipate can be realized.

Further, the above game program may further cause the computer to function as target object motion control means. The target object motion control means causes a target object, which is a target to be hit by a discharge object, to appear in the virtual game world. In this case, when one of the at least one discharge object has hit the target object, the player object motion control means may change, in accordance with the interval of detection, an effect of the one of the at least one discharge object exerted on the target object.

According to the above, the effect of the discharge object (e.g., attack power against the target object) discharged in accordance with the pulse or the heartbeat of the player, the effect being exerted on the target object, is changed in accordance with the interval of occurrence of the pulse or the heartbeat of the player. Accordingly, a further highly entertaining operation that the player cannot easily anticipate can be realized.

Further, when one of the at least one discharge object has hit the target object, it may be set such that the more is the number of the at least one discharge object discharged when the player object performs one discharging motion, the more the player object motion control means decreases the effect of the one of the at least one discharge object exerted on the target object.

According to the above, it is possible to adjust such that an overall effect of the at least one discharge object will not change significantly depending on the biological signal of the player.

Further, the player object motion control means may change, in accordance with the number of the at least one discharge object discharged in one discharging motion, a direction in which the at least one discharge object is to be discharged when the player object performs one discharging motion.

According to the above, the direction in which the discharge object is to be discharged in one discharging motion is changed in accordance with the interval of occurrence of the pulse or the heartbeat of the player. Accordingly, a further highly entertaining operation that the player cannot easily anticipate can be realized.

Further, when one of the at least one discharge object has hit the target object, it is set such that the shorter the interval of detection calculated by the interval calculation means is, the more the player object motion control means decreases the effect of the one of the at least one discharge object exerted on the target object.

According to the above, it is possible to adjust such that an overall effect of the at least one discharge object will not change significantly depending on the biological signal of the player.

Further, the above game program may further cause the computer to function as interval calculation means. The interval calculation means calculates an interval of detection of pulse or heartbeat of the player in accordance with the biological signal acquired by the biological signal acquisition means. In this case, the player object motion control means may set, in accordance with the interval of detection, a first parameter and a second parameter which relate to the at least one discharge object.

According to the above, in accordance with the detection interval of the pulse or the heartbeat, a plurality parameters can be set with respect to the discharge object. Accordingly, the discharge object can be set in a various manner.

Further, it may be set such that when the interval of detection calculated by the interval calculation means is short, the player object motion control means sets the first parameter to be relatively advantageous to the player, and sets the second parameter to be relatively disadvantageous to the player, whereas when the interval, of detection calculated by the interval calculation means is long, the player object motion control means sets the first parameter to be relatively disadvantageous to the player, and sets the second parameter to be relatively advantageous to the player.

According to the above, it is possible to adjust such that advantage/disadvantage to the player will not change significantly depending on the biological signal of the player.

Further, the above game program may further cause the computer to function as operation input acquisition means. The operation input acquisition means acquires an operation input performed by the player on an input device. In this case, the player object motion control means may cause the player object to perform in accordance with the operation input acquired by the operation input acquisition means.

According to the above, the player can cause the player character to perform by using the operation input, which is different from the operation using the biological information. Accordingly, various operations can be employed, and a further highly operation can be realized.

Further, the above game program may further cause the computer to function as operation input acquisition means. The operation input acquisition means acquires an operation input performed by the player on an input device. In this case, the player object motion control means may change, in accordance with the operation input acquired by the operation input acquisition means, a direction in which the at least one discharge object is to be discharged from the player object.

According to the above, the player can change the direction in which the discharge object is to be discharged by using the operation input, which is different from the operation using the biological information. Accordingly, various operation can be employed, and a further highly entertaining operation can be realized.

Further, the biological signal acquisition means may acquire as the biological signal a signal relating to a pulse wave or the heartbeat of the player. In this case, the pulse detection means may detect as the pulse or the heartbeat of the player a timing at which the signal relating to the pulse wave or the heartbeat acquired by the biological signal acquisition means indicates a local minimum value or a local maximum value.

Further, the biological signal acquisition means may acquire as the biological signal a signal relating to a pulse wave or the heartbeat of the player. In this case, the pulse detection means may detect as the pulse or the heartbeat of the player a timing at which a contraction rate or an expansion rate of blood vessels reaches a maximum value in the signal relating to the pulse wave or the heartbeat acquired by the biological signal acquisition means.

Further, the biological signal acquisition means may acquire as the biological signal a signal relating to a pulse wave or the heartbeat of the player. In this case, the pulse detection means may detect as the pulse or the heartbeat of the player a timing at which contraction acceleration or expansion acceleration of blood vessels reaches a maximum value in the signal relating to the pulse wave or the heartbeat acquired by the biological signal acquisition means.

According to the above, it is possible to detect the pulse or the heartbeat of the player accurately by using the signal relating to the pulse wave or the heartbeat obtained from the player.

Further, the second to fourth aspects of the present invention may be implemented in the form of a game apparatus or a game system including the above respective means, or in the form of a control method including operations performed by the above respective means.

According to the present invention, in accordance with the pulse or the heartbeat of the player or the user, a discharge object is discharged from the player character or the user object, and thus it is possible to perform a highly entertaining operation that the player or the user cannot easily anticipate.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an external view showing an example of a game system 1 according to an embodiment of the present invention;

FIG. 4 is a perspective view of the core unit 70 of FIG. 3 as viewed from a bottom front side thereof;

DESCRIPTION OF THE PREFERRED EMBODIMENTS

Figure 2:
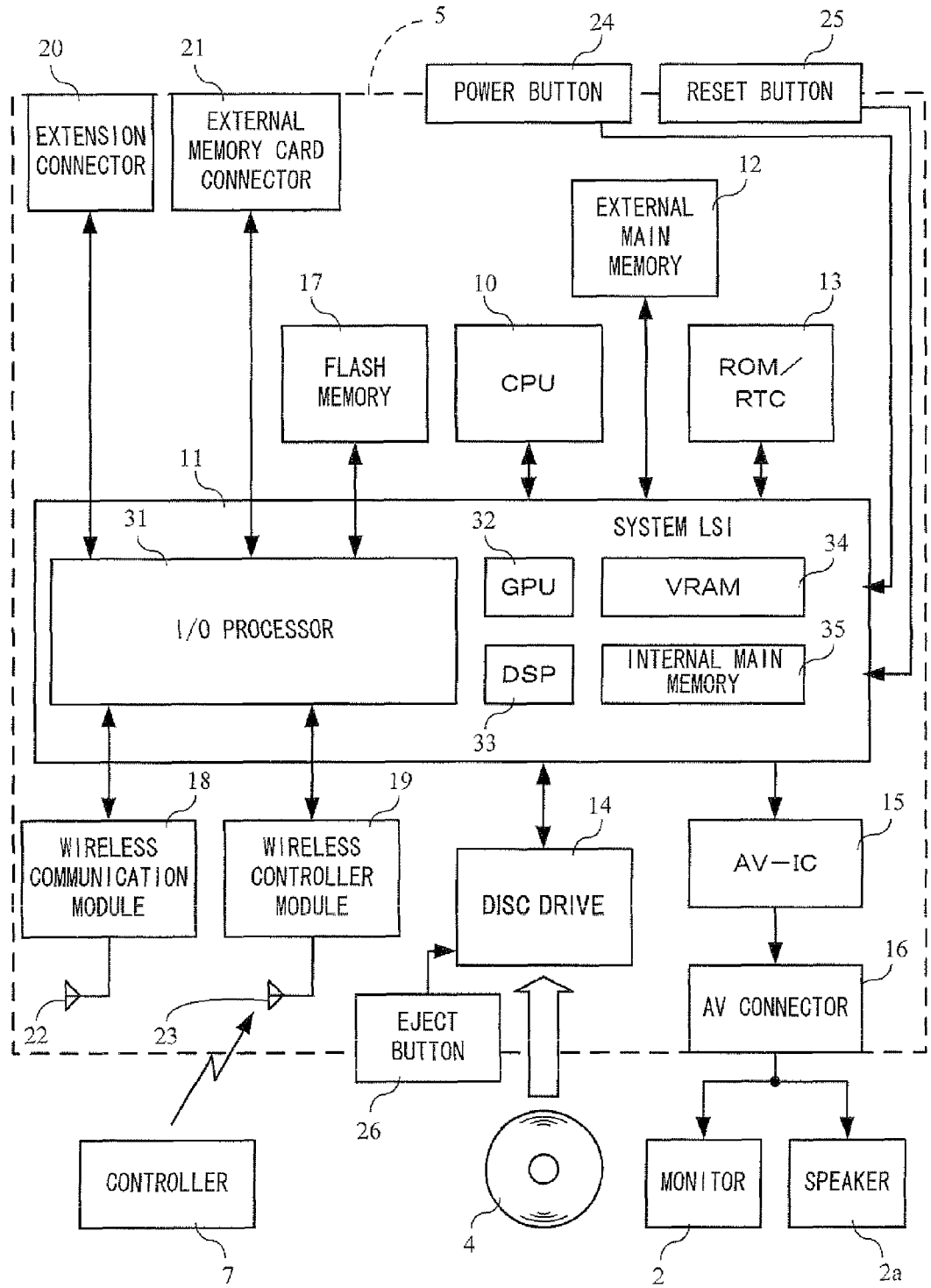
FIG. 2 is a block diagram showing an example of a game apparatus body 5 of FIG. 1.

With reference to FIG. 1, an apparatus for executing a game program according to one embodiment of the present invention is executed will be described. Hereinafter, in order to give a specific explanation, a description will be given using a game system including a stationary game apparatus body 5 that is an example of the above apparatus. FIG. 1 is an external view showing an example of a game system 1 including a stationary game apparatus 3. FIG. 2 is a block diagram showing an example of the game apparatus body 5. The game system 1 will be described, below.

As shown in FIG. 1, the game system 1 includes: a home-use television receiver 2 (hereinafter referred to as a monitor 2) which is an example of display means; and the stationary game apparatus 3 connected to the monitor 2 via a connection cord. The monitor 2 has loudspeakers 2a for outputting, in the form of sound, an audio signal outputted from the game apparatus 3. The game apparatus 3 includes: an optical disc 4 storing a game program of the present invention; the game apparatus body 5 having a computer for executing the game program of the optical disc 4 to output and display a game screen on the monitor 2; and a controller 7 for providing the game apparatus body 5 with necessary operation information for a game in which character or the like displayed in the game screen is controlled.

The game apparatus body 5 includes a wireless controller module 19 therein (see FIG. 2). The wireless controller module 19 receives data wirelessly transmitted from the controller 7, and transmits data from the game apparatus body 5 to the controller 7. In this manner, the controller 7 and the game apparatus body 5 are connected by wireless communication. Further, the optical disc 4 as an example of an exchangeable information storage medium is detachably mounted on the game apparatus body 5.

On the game apparatus body 5, a flash memory 17 (see FIG. 2) is mounted, the flash memory 17 acting as a backup memory for fixedly storing such data as save data. The game apparatus body 5 executes the game program or the like stored in the optical disc 4, and displays a result thereof as a game image on the monitor 2. The game program to be executed may be prestored not only in the optical disc 4, but also in the flash memory 17. The game apparatus body 5 may reproduce a state of the game played in the past, by using the save data stored in the flash memory 17, and display an image of the reproduced game state on the monitor 2. A player of the game apparatus 3 can enjoy advancing in the game by operating the controller 7 while watching the game image displayed on the monitor 2.

By using the technology of, for example, Bluetooth (registered trademark), the controller 7 wirelessly transmits transmission data, such as operation information and biological information, to the game apparatus body 5 having the wireless controller module 19 therein. The controller 7 includes a core unit 70 and a vital sensor 76. The core unit 70 and the vital sensor 76 are connected to each other via a flexible connection cable 79. The core unit 70 is operation means mainly for controlling an object or the like displayed on a display screen of the monitor 2. The vital sensor 76 is attached to a player's body (e.g., to the player's finger). The vital sensor obtains biological signals from the player, and sends biological information to the core unit 70 via the connection cable 79. The core unit 70 includes a housing, which is small enough to be held by one hand, and a plurality of operation buttons (including a cross key, a stick or the like) exposed at a surface of the housing. As described later in detail, the core unit 70 includes an imaging information calculation section 74 for taking an image of a view viewed from the core unit 70. As an example of imaging targets of the imaging information calculation section 74, two LED modules 8L and 8R (hereinafter, referred to as "markers 8L and 8R") are provided in the vicinity of the display screen of the monitor 2. These markers 8L and 8R each output, for example, an infrared light forward from the monitor 2. The controller 7 (e.g., the core unit 70) is capable of receiving, via a communication section 75, transmission data wirelessly transmitted from the wireless controller module 19 of the game apparatus body 5, and generating a sound or vibration based on the transmission data.

Note that, in this example, the core unit 70 and the vital sensor 76 are connected by the flexible connection cable 79. However, the connection cable 79 can be eliminated by mounting a wireless unit on the vital sensor 76. For example, by mounting a Bluetooth (registered trademark) unit on the vital sensor 76 as a wireless unit, transmission of biological information from the vital sensor 76 to the core unit 70 or to the game apparatus body 5 is enabled. Further, the core unit 70 and the vital sensor 76 may be integrated, by fixedly providing the vital sensor 76 on the core unit 70. In this case, a player can use the vital sensor 76 integrated with the core unit 70.

Next, an internal configuration of the game apparatus body 5 will be described with reference to FIG. 2. FIG. 2 is a block diagram showing the internal configuration of the game apparatus body 5. The game apparatus body 5 has a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15, and the like.

The CPU 10 performs game processing by executing the game program stored in the optical disc 4, and acts as a game processor. The CPU 10 is connected to the system LSI 11. In addition to the CPU 10, the external main memory 12, the ROM/RTC 13, the disc drive 14, and the AV-IC 15 are connected to the system LSI 11. The system LSI 11 performs processing such as: controlling data transfer among components connected to the system LSI 11; generating an image to be displayed; obtaining data from external devices; and the like. An internal configuration of the system LSI 11 will be described later. The external main memory 12 that is a volatile memory stores a program, for example, a game program loaded from the optical disc 4, or a game program loaded from the flash memory 17, and also stores various data. The external main memory 12 is used as a work area or buffer area of the CPU 10. The ROM/RTC 13 has a ROM in which a boot program for the game apparatus body 5 is incorporated (so-called a boot ROM), and has a clock circuit (RTC) which counts the time. The disc drive 14 reads program data, texture data and the like from the optical disc 4, and writes the read data into a later-described internal main memory 35 or into the external main memory 12.

On the system LSI 11, an input/output processor 31, a GPU (Graphic Processor Unit) 32, a DSP (Digital Signal Processor) 33, a VRAM (Video RAM) 34, and the internal main memory 35 are provided. Although not shown, these components 31 to 35 are connected to each other via an internal bus.

The GPU 32 is a part of rendering means, and generates an image in accordance with a graphics command from the CPU 10. The VRAM 34 stores necessary data for the GPU 32 to execute the graphics command (data such as polygon data, texture data and the like). At the time of generating the image, the GPU 32 uses the data stored in the VRAM 34, thereby generating image data.

The DSP 33 acts as an audio processor, and generates audio data by using sound data and sound waveform (tone) data stored in the internal main memory 35 and in the external main memory 12.

The image data and the audio data generated in the above manner are read by the AV-IC 15. The AV-IC 15 outputs the read image data to the monitor 2 via the AV connector 16, and outputs the read audio data to the loudspeakers 2a embedded in the monitor 2. As a result, an image is displayed on the monitor 2 and a sound is outputted from the loudspeakers 2a.

The input/output processor (I/O Processor) 31 performs, for example, data transmission/reception to/from components connected thereto, and data downloading from external devices. The input/output processor 31 is connected to the flash memory 17, a wireless communication module 18, the wireless controller module 19, an expansion connector 20, and an external memory card connector 21. An antenna 22 is connected to the wireless communication module 18, and an antenna 23 is connected to the wireless controller module 19.

The input/output processor 31 is connected to a network via the wireless communication module 18 and the antenna 22 so as to be able to communicate with other game apparatuses and various servers connected to the network. The input/output processor 31 regularly accesses the flash memory 17 to detect presence or absence of data that is required to be transmitted to the network. If such data is present, the data is transmitted to the network via the wireless communication module 18 and the antenna 22. Also, the input/output processor 31 receives, via the network, the antenna 22 and the wireless communication module 18, data transmitted from other game apparatuses or data downloaded from a download server, and stores the received data in the flash memory 17. By executing the game program, the CPU 10 reads the data stored in the flash memory 17, and the game program uses the read data. In addition to the data transmitted and received between the game apparatus body 5 and other game apparatuses or various servers, the flash memory 17 may store save data of a game that is played using the game apparatus body 5 (such as result data or progress data of the game).

Further, the input/output processor 31 receives, via the antenna 23 and the wireless controller module 19, operation data or the like transmitted from the controller 7, and stores (temporarily) the operation data or the like in a buffer area of the internal main memory 35 or of the external main memory 12. Note that, similarly to the external main memory 12, the internal main memory 35 may store a program, for example, a game program loaded from the optical disc 4 or a game program loaded from the flash memory 17, and also store various data. The internal main memory 35 may be used as a work area or buffer area of the CPU 10.

In addition, the expansion connector 20 and the external memory card connector 21 are connected to the input/output processor 31. The expansion connector 20 is a connector for such interface as USB, SCSI or the like. The expansion connector 20, instead of the wireless communication module 18, is able to perform communication with a network by being connected to such a medium as an external storage medium, to such a peripheral device as another controller, or to a connector for wired communication. The external memory card connector 21 is a connector to be connected to an external storage medium such as a memory card. For example, the input/output processor 31 is able to access the external storage medium via the expansion connector 20 or the external memory card connector 21 to store or read data from the external storage medium.

On the game apparatus body 5 (e.g., on a front main surface thereof), a power button 24 of the game apparatus body 5, a reset button 25 for resetting game processing, an insertion slot for mounting the optical disc 4 in a detachable manner, an eject button 26 for ejecting the optical disc 4 from the insertion slot of the game apparatus body 5, and the like are provided. The power button 24 and the reset button 25 are connected to the system LSI 11. When the power button 24 is turned on, each component of the game apparatus body 5 is supplied with power via an AC adaptor that is not shown. When the reset button 25 is pressed, the system LSI 11 re-executes the boot program of the game apparatus body 5. The eject button 26 is connected to the disc drive 14. When the eject button 26 is pressed, the optical disc 4 is ejected from the disc drive 14.

Figure 3:
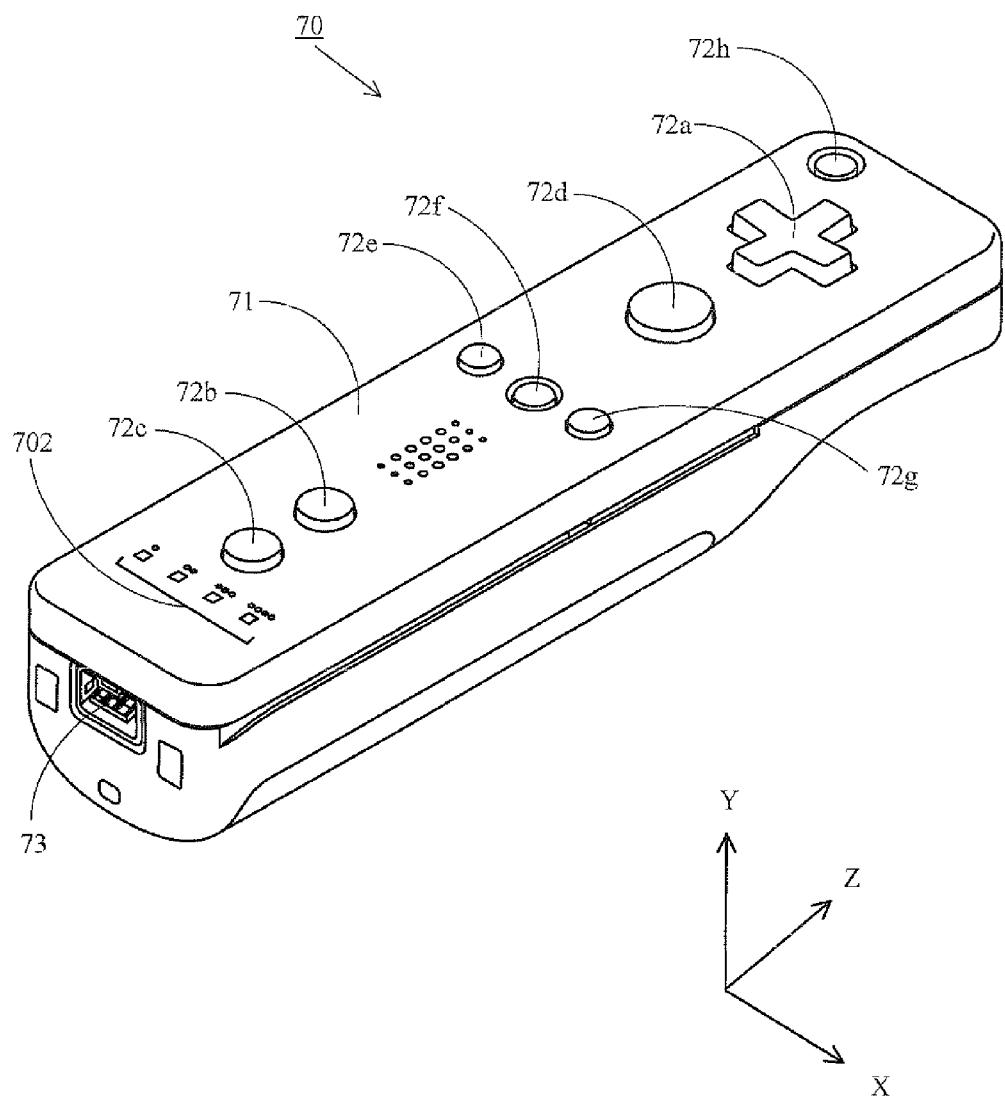
FIG. 3 is a perspective view of a core unit 70 of FIG. 1 as viewed from a top rear side thereof.

With reference to FIGS. 3 and 4, the core unit 70 will be described. FIG. 3 is a perspective view of the core unit 70 viewed from a top rear side thereof. FIG. 4 is a perspective view of the core unit 70 viewed from a bottom front side thereof.

As shown in FIGS. 3 and 4, the core unit 70 includes a housing 71 formed by plastic molding or the like. The housing 71 has a plurality of operation sections 72 provided thereon.

The housing 71 has an approximately parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions corresponding to four directions (front, rear, right and left), which are respectively located on cross-shaped projecting portions arranged at intervals of 90 degrees. A player selects one of the front, rear, right and left directions by pressing one of the operation portions of the cross key 72a. Through an operation of the cross key 72a, the player can, for example, designate a direction in which a player character or the like appearing in a virtual game world is to move, or give an instruction to select one of a plurality of options.

The cross key 72a is an operation section for outputting an operation signal in accordance with the aforementioned direction input operation performed by the player. Such an operation section may be provided in a different form. For example, an operation section, which has four push switches arranged in a cross formation and which is capable of outputting an operation signal in accordance with pressing of one of the push switches by the player, may be provided. Alternatively, an operation section, which has a composite switch having, in addition to the above four push switches, a center switch provided at an intersection point of the above cross formation, may be provided. Still alternatively, the crass key 72a may be replaced with an operation section which includes an inclinable stick (so-called a joy stick) projecting from the top surface of the housing 71 and which outputs an operation signal in accordance with an inclining direction of the stick. Still alternatively, the cross key 72a may be replaced with an operation section which includes a horizontally-slidable disc-shaped member and which outputs an operation signal in accordance with a sliding direction of the disc-shaped member. Still alternatively, the cross key 72a may be replaced with a touch pad.

Behind the cross key 72a on the top surface of the housing 71, a plurality of operation buttons 72b to 72g are provided. The operation buttons 72b to 72g are each an operation section for, when the player presses a head thereof, outputting a corresponding operation signal. For example, functions as a 1st button, a 2nd button and an A button are assigned to the operation buttons 72b to 72d. Also, functions as a minus button, a home button and a plus button are assigned to the operation buttons 72e to 72g, for example. Operation functions are assigned to the respective operation buttons 72a to 72g in accordance with the game program executed by the game apparatus body 5. In the exemplary arrangement shown in FIG. 3, the operation buttons 72b to 72d are arranged in a line at the center on the top surface of the housing 71 in a front-rear direction. The operation buttons 72e to 72g are arranged on the top surface of the housing 71 in a line in a left-right direction between the operation buttons 72b and 72d. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for turning on and off the game apparatus body 5 by remote control. The operation button 72h also has a top surface thereof buried in the top surface of the housing 71, so as not to be inadvertently pressed by the player.

Behind the operation button 72c on the top surface of the housing 71, a plurality of LEDs 702 are provided. Here, a controller type (a number) is assigned to the core unit 70 such that the core unit 70 is distinguishable from other controllers. The LEDs 702 are used for, e.g., informing the player of the controller type currently set for the core unit 70. Specifically, a signal is transmitted from the wireless controller module 19 to the core unit 70 such that one of the plurality of LEDs 702, which corresponds to the controller type of the core unit 70, is lit up.

On the top surface of the housing 71, sound holes for outputting sounds from a later-described speaker (a speaker 706 shown in FIG. 5) to the external space are formed between the operation button 72b and the operation buttons 72e to 72g.

On the bottom surface of the housing 71, a recessed portion is formed. The recessed portion on the bottom surface of the housing 71 is formed in a position in which an index finger or middle finger of the player is located when the player holds the core unit 70 with one hand so as to point a front surface thereof to the markers 8L and 8R. On a slope surface of the recessed portion, an operation button 72i is provided. The operation button 72i is an operation section acting as, for example, a B button.

On the front surface of the housing 71, an image pickup element 743 that is a part of the imaging information calculation section 74 is provided. The imaging information calculation section 74 is a system for: analyzing image data of an image taken by the core unit 70; identifying an area having a high brightness in the image; and detecting a position of the center of gravity, the size, and the like of the area. The imaging information calculation section 74 has, for example, a maximum sampling period of approximately 200 frames/sec, and therefore can trace and analyze even a relatively fast motion of the core unit 70. A configuration of the imaging information calculation section 74 will be described later in detail. On the rear surface of the housing 71, a connector 73 is provided. The connector 73 is, for example, an edge connector, and is used for engaging and connecting the core unit 70 with a connection cable, for example.

In order to give a specific description below, a coordinate system set with respect to the core unit 70 will be defined. As shown in FIGS. 3 and 4, an X-axis, a Y-axis and a Z-axis, which are perpendicular to one another, are defined with respect to the core unit 70. Specifically, the longitudinal direction of the housing 71, which is the front-rear direction of the core unit 70, is defined as the Z-axis, and a direction along the Z-axis toward the front surface (a surface on which the imaging information calculation section 74 is provided) of the core unit 70 is defined as a Z-axis positive direction. The up-down direction of the core unit 70 is defined as the Y-axis, and a direction along the Y-axis toward the top surface (a surface on which the operation button 72a is provided) of the housing 71 is defined as a Y-axis positive direction. The left-right direction of the core unit 70 is defined as the X-axis, and a direction along the X-axis toward the right side surface (a side surface shown in FIG. 3) of the housing 71 is defined as an X-axis positive direction.

Figure 5:
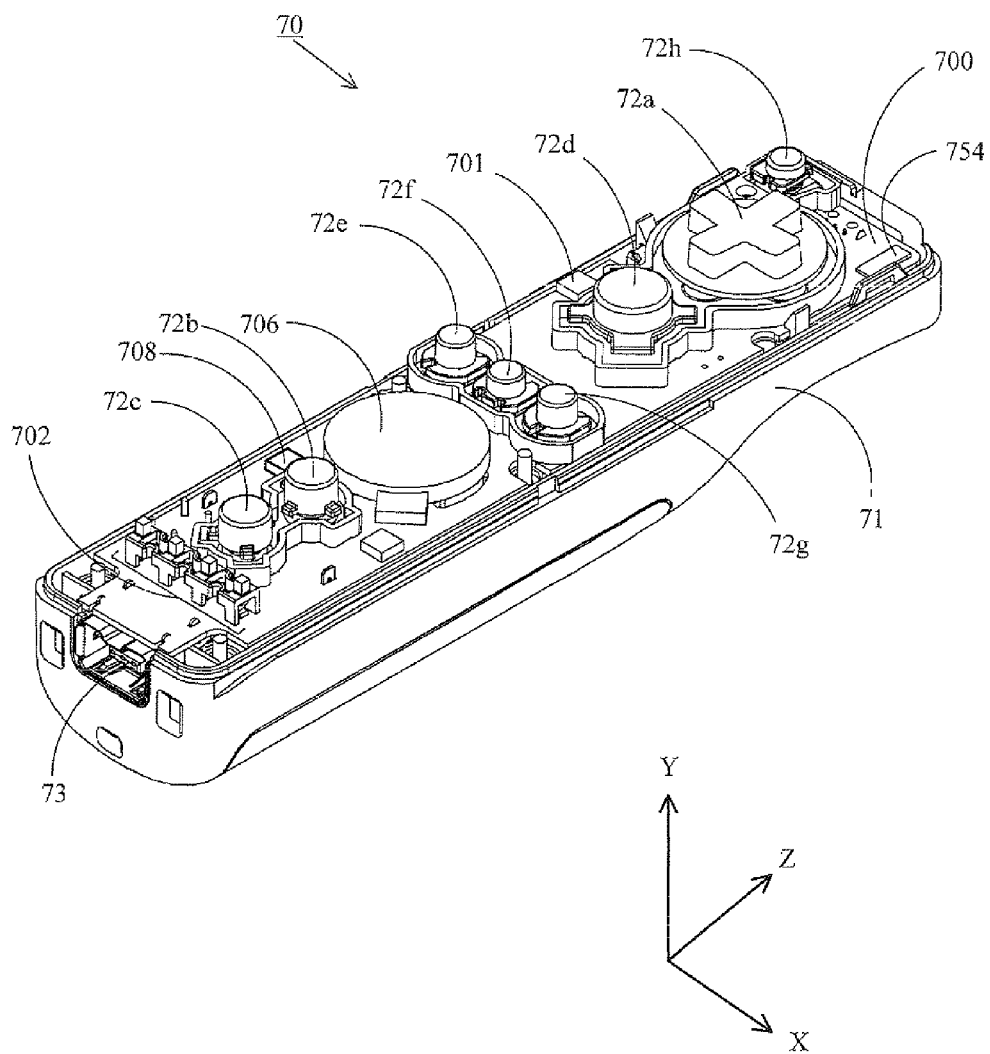
FIG. 5 is a perspective view illustrating an example of the core unit 70 of FIG. 3 in a state where an upper casing thereof is removed.
Figure 6:
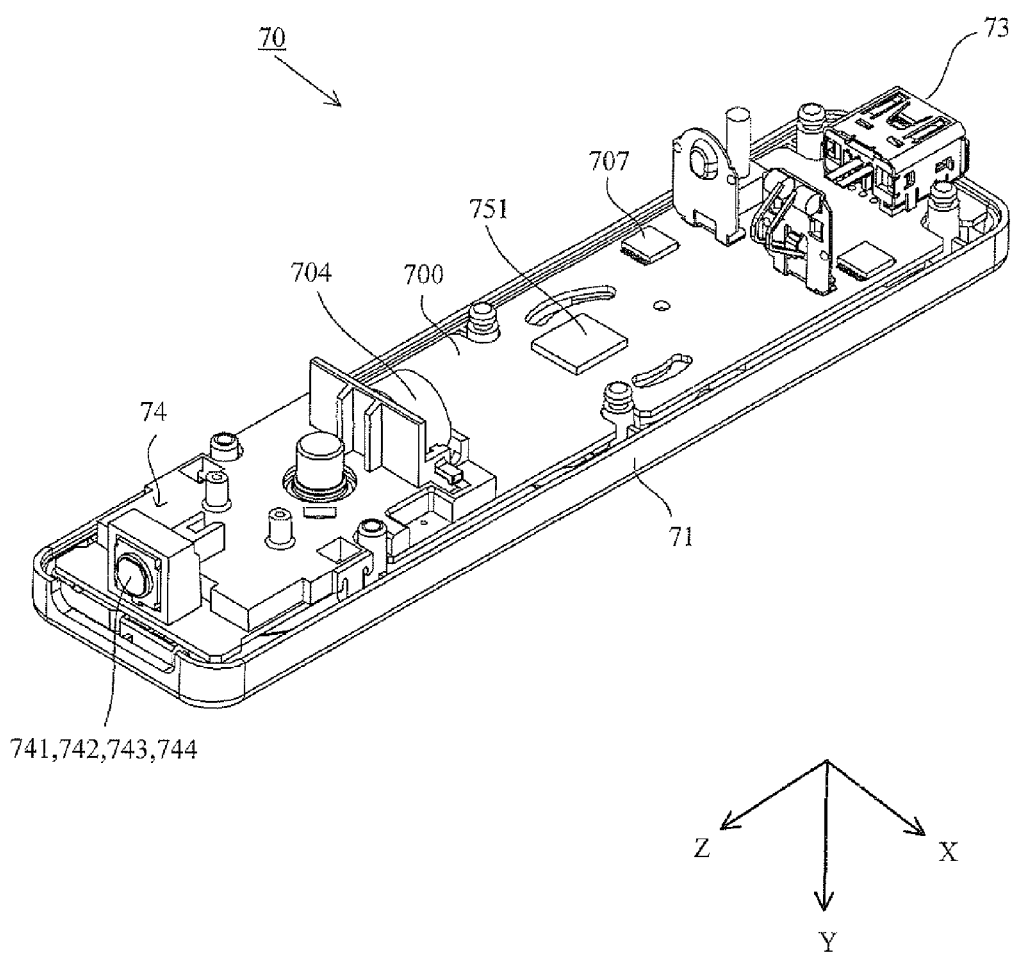
FIG. 6 is a perspective view illustrating an example of the core unit 70 of FIG. 4 in a state where a lower casing thereof is removed.

Next, an internal structure of the core unit 70 will be described with reference to FIGS. 5 and 6. FIG. 5 is a perspective view, viewed from a rear surface side, of an example of the core unit 70 in a state where an upper casing thereof (a part of the housing 71) is removed. FIG. 6 is a perspective view, viewed from a front surface side of the core unit 70, of an example of the core unit 70 in a state where a lower casing thereof (a part of the housing 71) is removed. Here, FIG. 6 is a perspective view showing a reverse side of a substrate 700 shown in FIG. 5.

As shown in FIG. 5, the substrate 700 is fixedly provided inside the housing 71. On a top main surface of the substrate 700, the operation buttons 72a to 72h, an acceleration sensor 701, the LEDs 702, an antenna 754 and the like are provided. These elements are connected to, for example, a microcomputer 751 (see FIGS. 6 and 7) by wiring (not shown) formed on the substrate 700 and the like. A wireless module 753 (see FIG. 7) and the antenna 754 allow the core unit 70 to act as a wireless controller. Inside the housing 71, a quartz oscillator, which is not shown, is provided, and the quartz oscillator generates a reference clock of the later-described microcomputer 751. Further, the speaker 706 and an amplifier 708 are provided on the top main surface of the substrate 700. The acceleration sensor 701 is provided, on the substrate 700, to the left side of the operation button 72d (i.e., provided not on a central part but on a peripheral part of the substrate 700). For this reason, in response to the core unit 70 having rotated around an axis of the longitudinal direction of the core unit 70, the acceleration sensor 701 is able to detect, in addition to a change in a direction of the gravitational acceleration, acceleration containing a centrifugal component, and the game apparatus body 5 or the like is able to determine, based on detected acceleration data, a motion of the core unit 70 by predetermined calculation with favorable sensitivity.

As shown in FIG. 6, at a front edge of the bottom main surface of the substrate 700, the imaging information calculation section 74 is provided. The imaging information calculation section 74 includes an infrared filter 741, a lens 742, the image pickup element 743, and an image processing circuit 744, which are located in said order from the front surface of the core unit 70. These elements are attached to the bottom main surface of the substrate 700. At a rear edge of the bottom main surface of the substrate 700, the connector 73 is attached. Further, a sound IC 707 and the microcomputer 751 are provided on the bottom main surface of the substrate 700. The sound IC 707 is connected to the microcomputer 751 and the amplifier 708 by wiring formed on the substrate 700 and the like, and outputs an audio signal via the amplifier 708 to the speaker 706 in response to sound data transmitted from the game apparatus body 5.

On the bottom main surface of the substrate 700, a vibrator 704 is attached. The vibrator 704 may be, for example, a vibration motor or a solenoid. The vibrator 704 is connected to the microcomputer 751 by wiring formed on the substrate 700 and the like, and is activated or deactivated in accordance with vibration data transmitted from the game apparatus body 5. The core unit 70 is vibrated by actuation of the vibrator 704, and the vibration is conveyed to the player's hand holding the core unit 70. Thus, a so-called vibration-feedback game is realized. Since the vibrator 704 is provided at a relatively forward position in the housing 71, the housing 71 held by the player significantly vibrates, and allows the player to easily feel the vibration.

Figure 7:
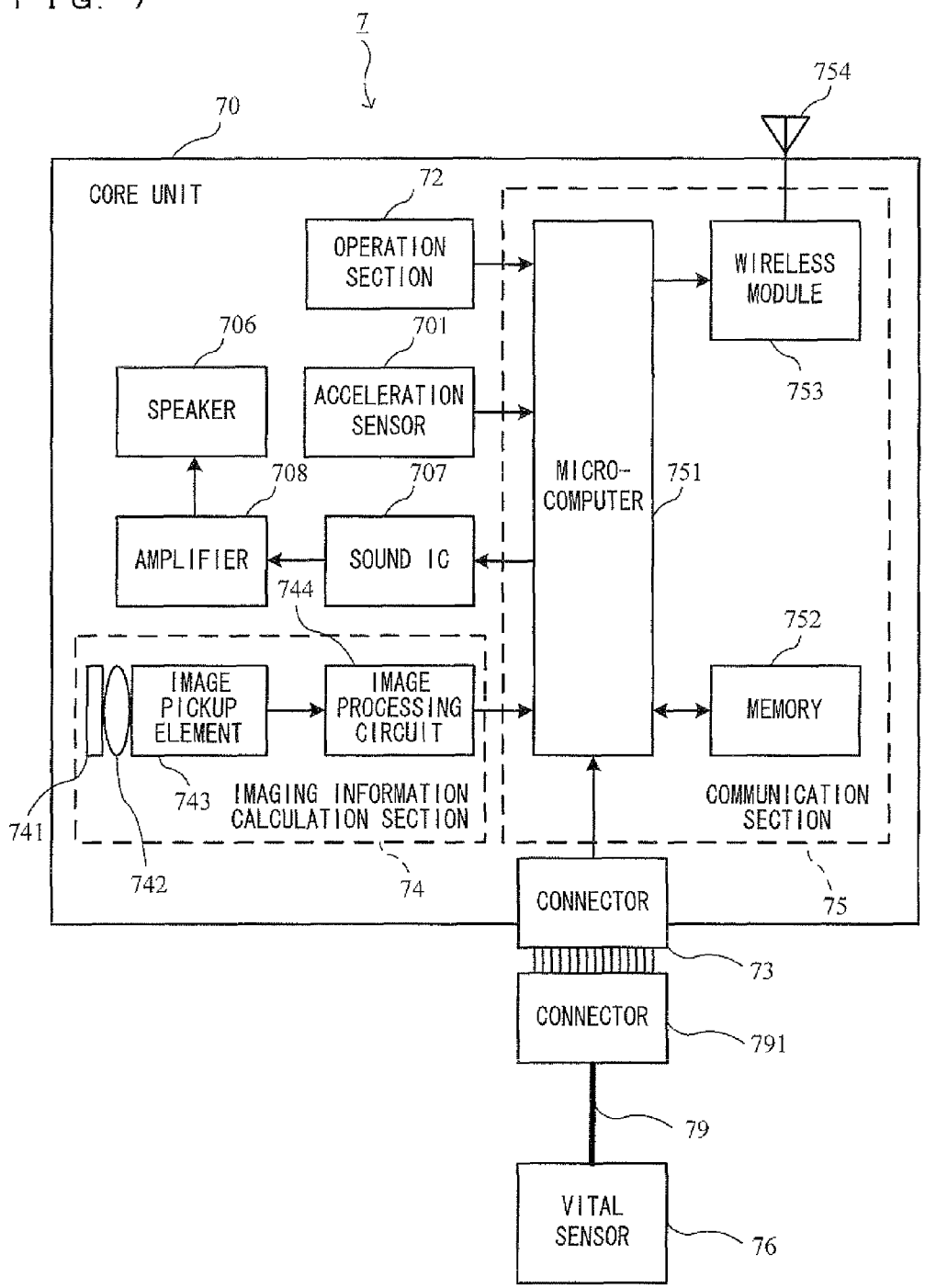
FIG. 7 is a block diagram showing an example of a configuration of the core unit 70 of FIG. 3.

Next, an internal configuration of the controller 7 will be described with reference to FIG. 7. FIG. 7 is a block diagram showing an example of the internal configuration of the controller 7.

As shown in FIG. 7, the core unit 70 includes the communication section 75 in addition to the above-described operation sections 72, the imaging information calculation section 74, the acceleration sensor 701, the vibrator 704, the speaker 706, the sound IC 707, and the amplifier 708. The vital sensor 76 is connected to the microcomputer 751 via the connection cable 79 and connectors 791 and 73.

The imaging information calculation section 74 includes the infrared filter 741, the lens 742, the image pickup element 743, and the image processing circuit 744. The infrared filter 741 allows, among lights incident thereon through the front surface of the core unit 70, only an infrared light to pass therethrough. The lens 742 condenses the infrared light having passed through the infrared filter 741, and outputs the condensed infrared light to the image pickup element 743. The image pickup element 743 is a solid-state image pickup element such as a CMOS sensor, CCD or the like. The image pickup element 743 takes an image of the infrared light condensed by the lens 742. In other words, the image pickup element 743 takes an image of only the infrared light having passed through the infrared filter 741. Then, the image pickup element 743 generates image data of the image. The image data generated by the image pickup element 743 is processed by the image processing circuit 744. Specifically, the image processing circuit 744 processes the image data obtained from the image pickup element 743, and detects a high brightness area of the image, and outputs, to the communication section 75, process result data indicating results of detecting, for example, position coordinates, a square measure and the like of the high brightness area. The imaging information calculation section 74 is fixed to the housing 71 of the core unit 70. An imaging direction of the imaging information calculation section 74 can be changed by changing a facing direction of the housing 71.

Preferably, the core unit 70 includes a triaxial (X-axis, Y-axis, and Z-axis) acceleration sensor 701. The triaxial acceleration sensor 701 detects linear acceleration in three directions, i.e., the up-down direction (the Y-axis shown in FIG. 3), the left-right direction (the X-axis shown in FIG. 3), and the front-rear direction (the Z-axis shown in FIG. 3). Alternatively, an accelerometer capable of detecting linear acceleration along at least one axis direction (e.g., Z-axis direction) may be used. As a non-limiting example, the acceleration sensor 701 may be of the type available from Analog Devices, Inc. or STMicroelectronics N.V. Preferably, the acceleration sensor 701 is an electrostatic capacitance or capacitance-coupling type that is based on silicon micromachined MEMS (microelectromechanical systems) technology. However, any other suitable accelerometer technology (e.g., piezoelectric type or piezoresistance type) now existing or later developed may be used to provide the acceleration sensor 701.

Accelerometers, as used in the acceleration sensor 701, are only capable of detecting acceleration along a straight line (linear acceleration) corresponding to each axis of the acceleration sensor 701. In other words, the direct output of the acceleration sensor 701 is limited to signals indicating linear acceleration (static or dynamic) along each of the three axes thereof. As a result, the acceleration sensor 701 cannot directly detect movement along a non-linear (e.g., arcuate) path, rotation, rotational movement, angular displacement, inclination, position, orientation or any other physical characteristic. However, through processing by a computer such as a processor of the game apparatus (e.g., the CPU 10) or a processor of the controller (e.g., the microcomputer 751) based on the acceleration signals outputted from the acceleration sensor 701, additional information relating to the core unit 70 can be inferred or calculated (determined), as one skilled in the art will readily understand from the description herein.

The communication section 75 includes the microcomputer 751, a memory 752, the wireless module 753, and the antenna 754. The microcomputer 751 controls the wireless module 753 that wirelessly transmits transmission data, while using the memory 752 as a storage area during processing. The microcomputer 751 also controls operations of the sound IC 707 and the vibrator 704 (not shown) in accordance with data which the wireless module 753 has received from the game apparatus body 5 via the antenna 754. The sound IC 707 processes sound data or the like which is transmitted from the game apparatus body 5 via the communication section 75. Further, the microcomputer 751 activates the vibrator 704 in accordance with vibration data or the like (e.g., a signal for causing the vibrator 704 to be ON or OFF) which is transmitted from the game apparatus body 5 via the communication section 75.

Operation signals from the operation sections 72 provided on the core unit 70 (key data), acceleration signals from the acceleration sensor 701 with respect to the three axial directions (X-, Y- and Z-axis direction acceleration data), and the process result data from the imaging information calculation section 74, are outputted to the microcomputer 751. Also, biological signals (biological information data) provided from the vital sensor 76 are outputted to the microcomputer 751 via the connection cable 79. The microcomputer 751 temporarily stores inputted data (the key data, the X-, Y- and Z-axis direction acceleration data, the process result data, and the biological information data) in the memory 752 as transmission data to be transmitted to the wireless controller module 19. Here, wireless transmission from the communication section 75 to the wireless controller module 19 is performed at predetermined time intervals. Since game processing is generally performed at a cycle of 1/60 sec, the wireless transmission needs to be performed at a shorter cycle. Specifically, game processing is performed at a cycle of 16.7 ms (1/60 sec), and a transmission interval of the communication section 75 configured using the Bluetooth (registered trademark) technology is 5 ms. At a timing of performing transmission to the wireless controller module 19, the microcomputer 751 outputs, to the wireless module 753, the transmission data stored in the memory 752 as a series of pieces of operation information. The wireless module 753 uses, for example, the Bluetooth (registered trademark) technology to radiate, using a carrier wave having a predetermined frequency, a radio signal from the antenna 754, the radio signal indicating the series of pieces of operation information. Thus, the key data from the operation sections 72 provided on the core unit 70, the X-, Y- and Z-axis direction acceleration data from the acceleration sensor 701, the process result data from the imaging information calculation section 74, and the biological information data from the vital sensor 76, are transmitted from the core unit 70. The wireless controller module 19 of the game apparatus body 5 receives the radio signal, and the game apparatus body 5 demodulates or decodes the radio signal to obtain the series of pieces of operation information (the key data, the X-, Y- and Z-axis direction acceleration data, the process result data, and the biological information data). In accordance with the series of pieces of obtained operation information and the game program, the CPU 10 of the game apparatus body 5 performs game processing. In the case where the communication section 75 is configured using the Bluetooth (registered trademark) technology, the communication section 75 can have a function of receiving transmission data wirelessly transmitted from other devices.

Figure 8:
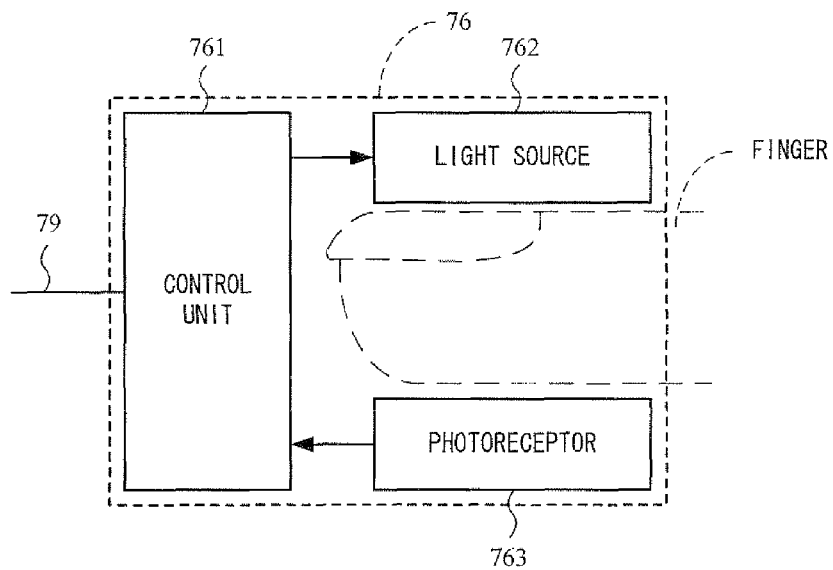
FIG. 8 is a block diagram showing an example of a configuration of a vital sensor 76.
Figure 9:
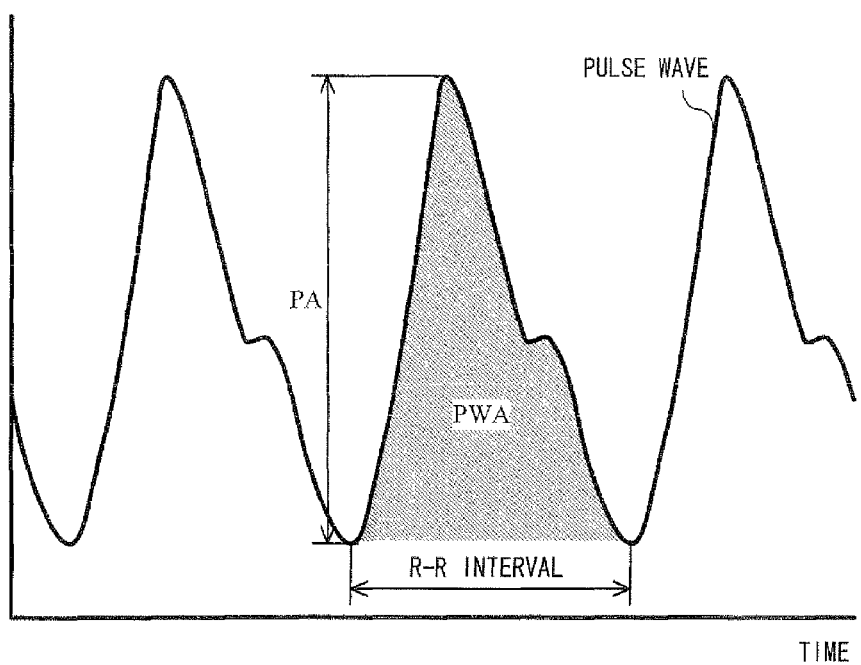
FIG. 9 is a diagram showing an example of pulse wave information which is an example of biological information outputted from the vital sensor 76.

Next, with reference to FIGS. 8 and 9, the vital sensor 76 will be described. Note that FIG. 8 is a block diagram showing an example of a configuration of the vital sensor 76. FIG. 9 is a diagram showing pulse wave information which is an example of biological information outputted from the vital sensor 76.

In FIG. 8, the vital sensor 76 includes a control unit 761, a light source 762, and a photodetector 763.

The light source 762 and the photodetector 763 constitutes a transmission-type digital-plethysmography sensor, which is an example of a sensor which obtains a biological signal of the player. The light source 762 includes, for example, an infrared LED which emits infrared light having a predetermined wavelength (e.g., 940 nm) toward the photodetector 763. On the other hand, the photodetector 763, which includes, for example, an infrared photoresistor, senses light emitted by the light source 762, depending on the wavelength of the emitted light. The light source 762 and the photodetector 763 are arranged, facing each other, with a predetermined gap (hollow space) being interposed therebetween.

Here, hemoglobin which exists in human blood absorbs infrared light. For example, a part (e.g., a fingertip) of the player's body inserted in the gap between the light source 762 and the photodetector 763. In this case, infrared light emitted from the light source 762 is partially absorbed by hemoglobin existing in the inserted fingertip before being sensed by the photodetector 763. Arteries in the human body pulsate, and therefore, the thickness (blood flow rate) of the artery varies depending on the pulsation. Therefore, similar pulsation occurs in arteries in the inserted fingertip, and the blood flow rate varies depending on the pulsation, so that the amount of infrared light absorption also varies depending on the blood flow rate. Specifically, as the blood flow rate in the inserted fingertip increases, the amount of light absorbed by hemoglobin also increases and therefore the amount of infrared light sensed by the photodetector 763 relatively decreases. Conversely, as the blood flow rate in the inserted fingertip decreases, the amount of light absorbed by hemoglobin also decreases and therefore the amount of infrared light sensed by the photodetector 763 relatively increases. The light source 762 and the photodetector 763 utilize such an operating principle, i.e., convert the amount of infrared light sensed by the photodetector 763 into a photoelectric signal to detect pulsation (hereinafter referred to as a pulse wave) of the human body. For example, as shown in FIG. 9, when the blood flow rate in the inserted fingertip increases, the detected value of the photodetector 763 increases, and when the blood flow rate in the inserted fingertip decreases, the detected value of the photodetector 763 decreases. Thus, a pulse wave portion in which the detected value of the photodetector 763 rises and falls is generated as a pulse wave signal. Note that, in some circuit configuration of the photodetector 763, a pulse wave signal may be generated in which, when the blood flow rate in the inserted fingertip increases, the detected value of the photodetector 763 decreases, and when the blood flow rate in the inserted fingertip decreases, the detected value of the photodetector 763 increases.

The control unit 761 includes, for example, a MicroController Unit (MCU). The control unit 761 controls the amount of infrared light emitted from the light source 762. The control unit 761 also performs A/D conversion with respect to a photoelectric signal (pulse wave signal) outputted from the photodetector 763 to generate pulse wave data (biological information data). Thereafter, the control unit 761 outputs the pulse wave data (biological information data) via the connection cable 79 to the core unit 70.

In the game apparatus body 5, pulse wave data obtained from the vital sensor 76 is analyzed, whereby various biological information on the player using the vital sensor 76 can be detected/calculated. As a first example, in the game apparatus body 5, in accordance with peaks and dips of the pulse wave indicated by the pulse wave data obtained from the vital sensor 76, it is possible to detect a pulse timing of a player (e.g., a timing at which the heart contracts, more exactly, a timing indicating pulse at a body part wearing the vital sensor 76, where the blood vessels contract or expand). Specifically, in the game apparatus body 5, it is possible to detect as the pulse timing of a player, for example, a timing at which the pulse wave indicated by the pulse wave data obtained from the vital sensor 76 represents a local minimum value, a timing at which the pulse wave represents a local maximum value, a timing at which a blood vessel contraction rate reaches its maximum value, a timing at which a blood vessel expansion rate reaches its maximum value, a timing at which acceleration of the blood vessel expansion rate reaches its maximum value, a timing at which deceleration of the blood vessel expansion rate reaches its maximum value, or the like.

As a second example, it is possible to calculate a heart rate HR by using the pulse timing of a player detected from the pulse wave indicated by the pulse wave data. For example, a value obtained by dividing 60 seconds by the interval of pulse timings is calculated as the heart rate HR of the player using the vital sensor 76. Specifically, when the timing at which the pulse wave represents the local minimum value is set as the pulse timing, 60 seconds is divided by the interval of heartbeats between adjoining two local minimum values (an R-R interval shown in FIG. 9), whereby the heart rate HR is calculated.

As a third example, it is possible to calculate a respiration frequency of a player by using a rise-fall cycle of the heart rate HR. Specifically, when the heart rate HR calculated in this embodiment is rising, it is determined that the player is breathing in, and when the heart rate HR is falling, it is determined that the player is breathing out. That is, by calculating the rise-fall cycle (fluctuation cycle) of the heart rate HR, it is possible to calculate the cycle (respiration frequency) of breathing of the player.

As a fourth example, it is possible to determine the degree of easiness and difficulties felt by a player by using an amplitude PA of the pulse wave indicated by the pulse wave data obtained from the vital sensor 76 (e.g., the difference in the height between a local maximum value of the pulse wave and the succeeding local minimum value; see FIG. 9). Specifically, when the amplitude PA of the pulse wave is decreased, it can be determined that the player is in a difficult state.

As a fifth example, it is possible to obtain a blood flow rate of a player by dividing a pulse wave area PWA (see FIG. 9) obtained from the pulse wave signal by the heart rate HR.

As a sixth example, it is possible to calculate a coefficient of variance of the heartbeat of a player (coefficient of variance of R-R interval: CVRR) by using the interval of the pulse timings of the player (the interval of heartbeats; e.g., an R-R interval shown in FIG. 9) detected from the pulse wave indicated by the pulse wave data. For example, the coefficient of variance of the heartbeat is calculated by using the interval of heartbeats based on the past 100 beats indicated by the pulse wave obtained from the vital sensor 76. Specifically, the following equation is applied for calculation.

Coefficient of variance of heartbeat={(standard deviation of the interval of 100 heartbeats)/(average value of the interval of 100 heartbeats)}×100

With the use of the coefficient of variance of the heartbeat, it is possible to calculate the state of the autonomic nerve of the player (e.g., the activity of the parasympathetic nerve).

Figure 11:
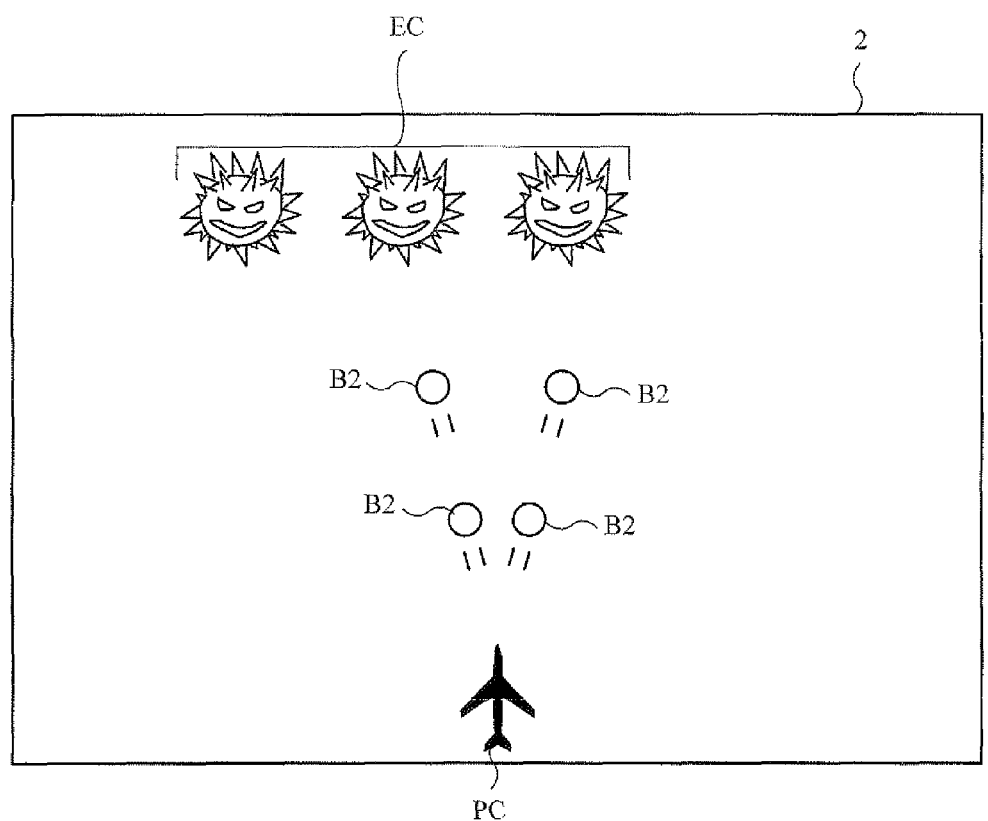
FIG. 11 is a diagram showing an example of a game image displayed on a monitor 2.
Figure 12:
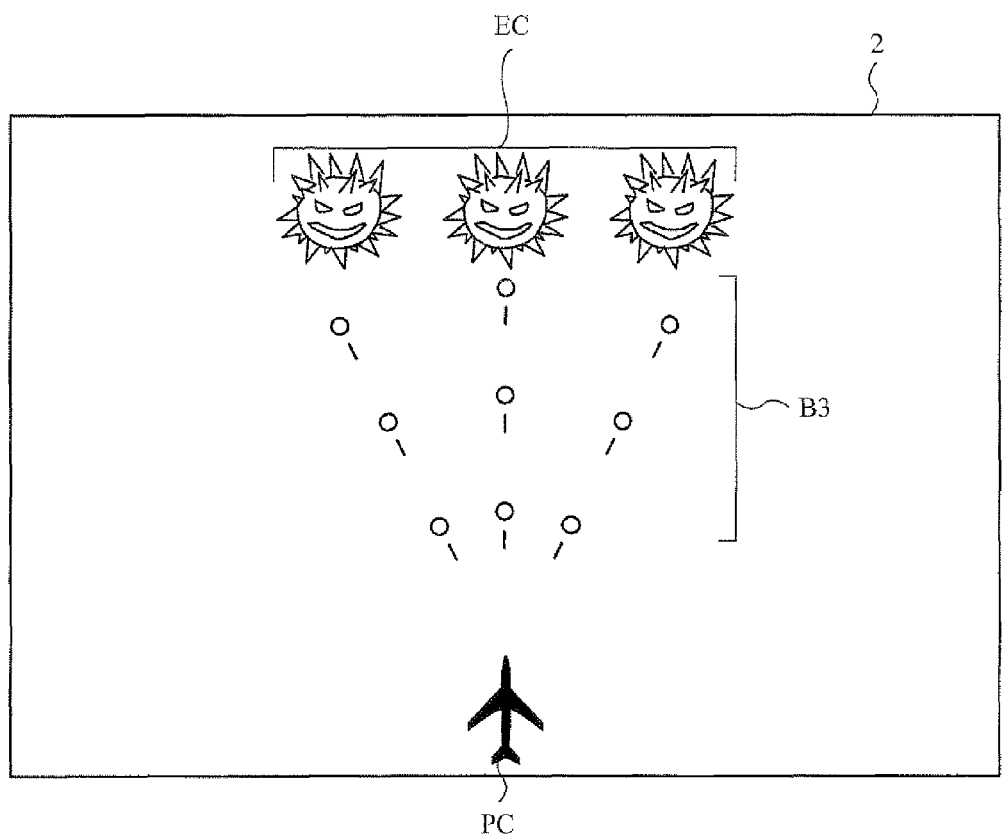
FIG. 12 is a diagram showing an example of a game image displayed on a monitor 2.

Next, an overview of game processing performed on the game apparatus body 5 will be described with reference to FIGS. 10 to 12 before a specific description of processes performed by the game apparatus body 5 is given. Note that FIGS. 10 to 12 are diagrams showing game images displayed on the monitor 2.

Figure 10:
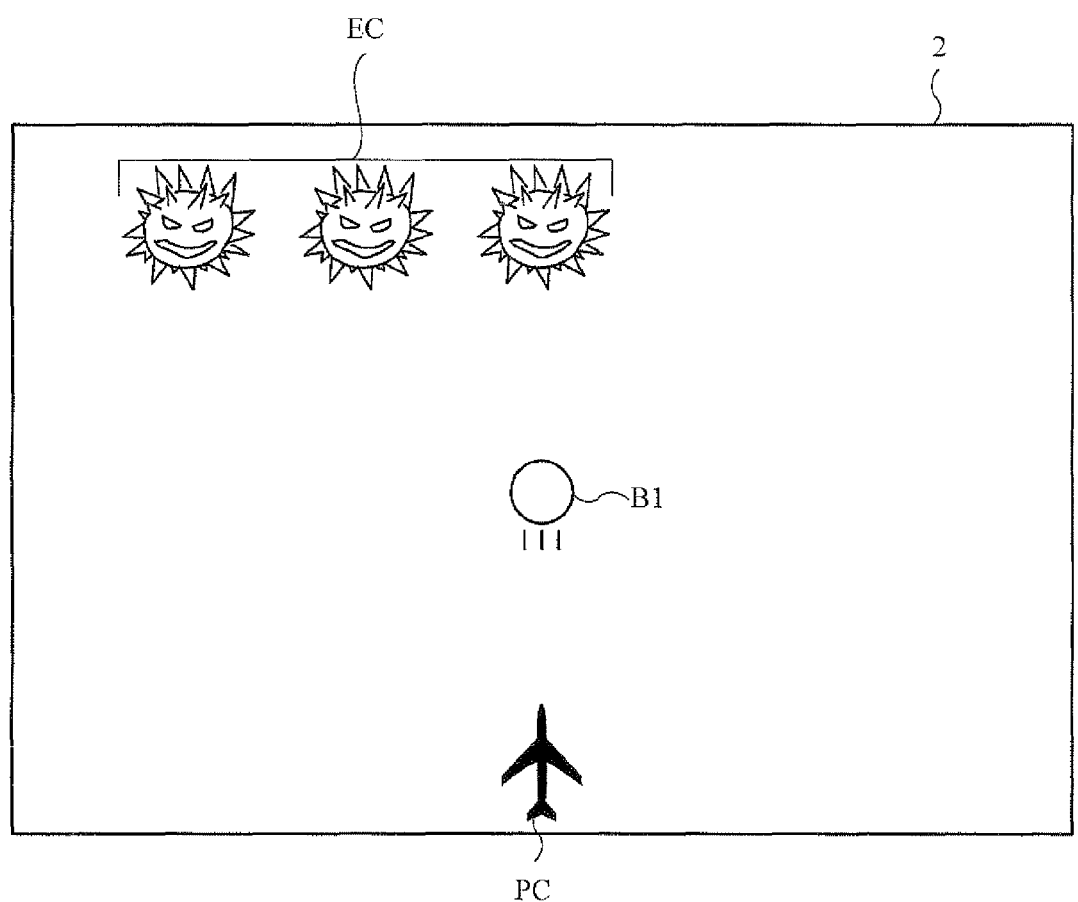
FIG. 10 is a diagram showing an example of a game image displayed on a monitor 2.

In FIG. 10, the monitor 2 represents a virtual game world in which a player character PC and enemy characters EC are arranged. The player character PC moves in the virtual game world in accordance with operations performed on the operation section 72 (e.g., the cross key 72a) of the core unit 70. The player character PC discharges a "discharge object" (e.g., a bullet B) in the virtual game world in accordance with the biological information which is based on the pulse wave data obtained from the vital sensor 76. Specifically, in accordance with a pulse timing of a player detected by the game apparatus body 5, a predetermined number of bullets B are discharged. When any of the bullets B hits any of the enemy characters EC, the endurance of the enemy characters EC decreases depending on the attack power of the hitting bullet B. When the attack power of the bullet B having hit the enemy character EC exceeds the endurance of the enemy characters EC, the enemy character EC disappear from the virtual game world. Note that, in the following description, the bullet B is used as an example of the discharge object used by the player character PC to hit the enemy character EC. The "discharge object" used in the this specification represents an object discharged by the player character PC to hit the enemy character EC, and includes a gun bullet, a cell, a bomb, a hand grenade, a rocket, a missile, a ball, an arrow, a beam, a laser beam, and the like in the virtual game world.

Here, the configuration of the discharge object discharged per pulse timing from the player character PC may be changed depending on the interval of the pulse timings (interval of heartbeats) of the player. As a first example, the number of bullets B to be discharged per pulse timing from the player character PC and the direction of the bullets B to be discharged are changed depending on the interval of the pulse timings (interval of heartbeats) of the player. For example, when the heart rate HR of the player is lower than a previously set first threshold, the player character PC discharges one bullet B1 at one pulse timing of the player (the state shown in FIG. 10). At this time, the player character PC discharges one bullet B1 forward from the front of the player character PC (in the upward direction in the drawing, the direction referred to as a discharge direction A). When the heart rate HR of the player is equal to or higher than the first threshold and is lower than a previously set second threshold, the player character PC discharges two bullets B2 at one pulse timing of the player (the state shown in FIG. 11). At this time, the player character PC discharges two bullets B2 forward each at a predetermined angle relative to the directly forward direction of the player character PC (discharge direction B). When the heart rate HR of the player is equal to or higher than the second threshold, and is lower than a previously set third threshold, the player character PC discharges three bullets B3 at one pulse timing of the player (the state shown in FIG. 12). At this time, the player character PC discharges three bullets B3 forward, one to the forward direction of the player character PC and the remaining two each at a predetermined angle relative to the directly forward direction of the player character PC (discharge direction C). Further, when the heart rate HR of the player is equal to or higher than the third threshold, the player character PC discharges five bullets B5 at one pulse timing of the player. At this time, the player character PC discharges five bullets B5 forward in an angle range wider than that for three bullets B3, where the front direction from the player character PC is set as the center of the angle range (discharge direction D).

As a second example, the attack power of the bullet B against the enemy characters EC, the bullet B being discharged from the player character PC, is changed depending on the interval of the pulse timings (interval of heartbeats) of the player. When the heart rate HR of the player is lower than a previously set first threshold, the player character PC discharges the bullet B1 having a first attack power, which is the highest attack power (the state shown in FIG. 10). When the heart rate HR of the player is equal to or higher than the first threshold and is lower than a previously set second threshold, the player character PC discharges the bullets B2 each having a second attack power, which is lower than the first attack power (the state shown in FIG. 11). Further, when the heart rate HR of the player is equal to or higher than the second threshold and lower than a previously set third threshold, the player character PC discharges the bullets B3 each having a third attack power, which is lower than the second attack power (the state shown in FIG. 12). Further, when the heart rate HR of the player is equal to or higher than the third threshold, the player character PC discharges bullets B5 each having a fourth attack power, which is lower than the third attack power.

In this manner, the player character PC discharges the discharge object in accordance with the interval of the pulse timings of the player (e.g., a heart contraction timing, exactly, a timing at which the blood vessels of the site of a player's body, to which the vital sensor 76 is attached, contract or expand). Accordingly, a highly entertaining shooting operation which the player cannot easily anticipate can be realized. Further, when the configuration of the discharge object (the number of discharge objects, the attack power of the discharge object, and the discharge direction or the like) discharged per pulse timing of the player is changed depending on the heart rate HR of the player, i.e., depending on the interval of the pulse timings (interval of heartbeats) of the player, then a further highly entertaining shooting operation which the player cannot easily anticipate can be realized.

Figures 13, 14:
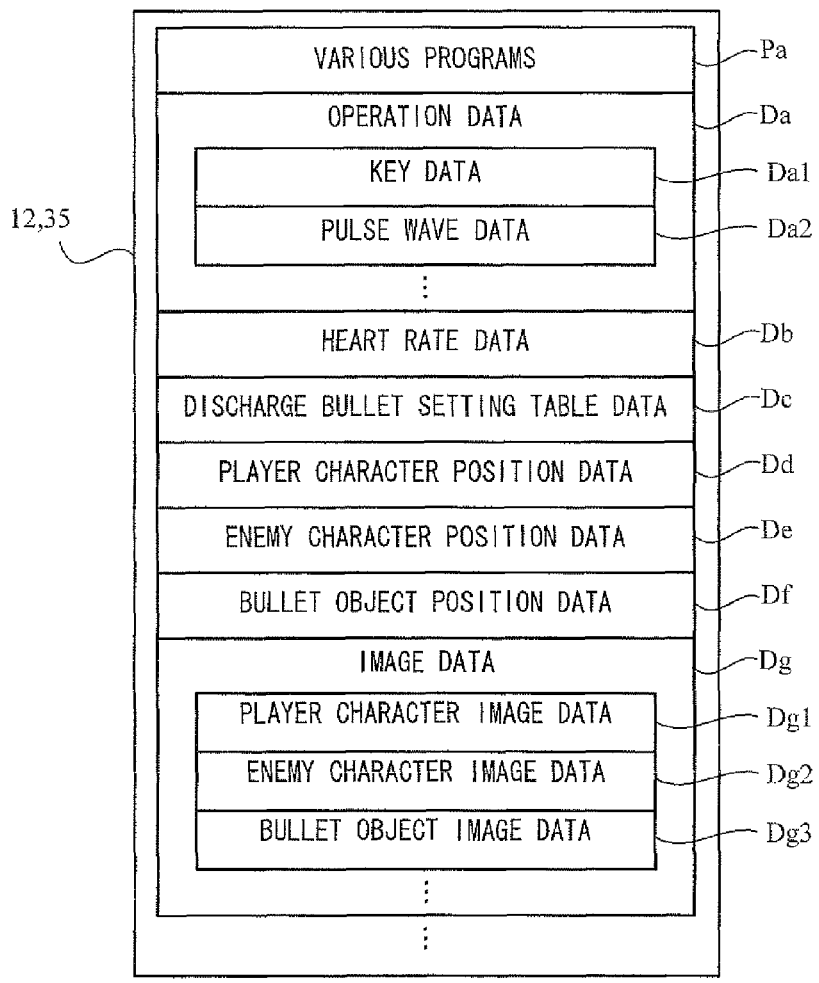
FIG. 13 is a diagram showing examples of major data and programs stored in a main memory of the game apparatus body 5.
FIG. 14 is a diagram showing an example of a discharge bullet setting table data Dc stored in the main memory of the game apparatus body 5.

Next, game processing performed on the game system 1 will be described in detail. Firstly, with reference to FIGS. 13 and 14, main data used in game processing will be described. Note that FIG. 13 is a diagram showing an example of main data and programs stored in the external main memory 12 and/or the internal main memory 35 (hereinafter, the two main memories are collectively referred to as a main memory) of the game apparatus body 5. FIG. 14 is a diagram showing an example of discharge bullet setting table data Dc stored in the main memory of the game apparatus body 5.

As shown in FIG. 13, a data storing area of the main memory stores operation data Da, heart rate data Db, discharge bullet setting table data Dc, player character position data Dd, enemy character position data De, bullet object position data Df, image data Dg, and the like. Note that, in addition to data shown in FIG. 13, the main memory stores therein data necessary for game processing such as data (position data or the like) on other objects than the player character PC and the enemy characters EC appearing in the game, data on the virtual game world (background data or the like). The program storage area of the main memory stores various programs Pa configuring a game program.

The operation data Da includes key data Da1, pulse wave data Da2, and the like. The key data Da1 indicates the plurality of operation sections 72, having been operated, in the core unit 70, and is included in the series of pieces of operation information which are transmitted as transmission data from the core unit 70. Note that the wireless controller module 19 included in the game apparatus body 5 receives key data included in the operation information transmitted from the core unit 70 in predetermined cycles (e.g., 1/200 sec) and stores the received data into a buffer (not shown) included in the wireless controller module 19. Thereafter, the key data stored in the buffer is read every frame period (e.g., 1/60 sec.), which corresponds to a game processing cycle, and thereby the key data Da1 in the main memory is updated.

In this case, the cycle of the reception of the operation information is different from the processing cycle, and therefore, a plurality of pieces of information received at a plurality of timings are stored in the buffer. In a description of the process below, only the latest one of a plurality of pieces of operation information received at a plurality of timings is invariably used to perform processing in each step described below, whereby the processing proceeds to the subsequent step.

In addition, in the process flow described below, an example will be used in which the key data Da1 is updated every frame, which corresponds to the game processing period, however, the key data Da1 may be updated in other process cycles. For example, the key data Da1 may be updated in transmission cycles of the core unit 70, and the updated key data Da1 may be used in game processing cycles. In this case, the cycle in which the key data Da1 is updated is different from the game processing cycle.

The pulse wave data Da2 indicates a pulse wave signal of a required time length obtained from the vital sensor 76, and is included in a series of pieces of operation information transmitted as transmission data from the core unit 70. A history of a pulse wave signal of a time length required in a process described below is stored as pulse wave data into the pulse wave data Da2, and is updated as appropriate in response to reception of operation information.

The heart rate data Db indicates a history of the heart rate HR (e.g., a value obtained by dividing 60 seconds by the interval of heartbeats (e.g., R-R interval)) of a player for a predetermined time period.

The discharge bullet setting table data Dc is previously set table data so as to set the number of bullets B to be discharged by a player character PC, the attack power of each bullet B, and the discharge direction. With reference to FIG. 14, an example of the discharge bullet setting table data Dc will be described below.

In FIG. 14, the "number of bullets to be discharged", the "attack power", and the "discharge direction", which are set in accordance with the heart rate HR of a player, are described in the discharge bullet setting table data Dc. Here, the "number of bullets to be discharged" indicates the number of bullets B to be discharged at one pulse timing from the player character PC. The "attack power" indicates the attack power of one bullet B to be discharged from the player character PC against the enemy characters EC. The "discharge direction" indicates the direction in which at least one bullet B is discharged from the player character PC in accordance with the "number of bullets to be discharged" (e.g., the above-described discharge directions A to D).

Specifically, when the heart rate HR is lower than 60, the "number of bullets to be discharged" is set as one, the "attack power" is set as 120, and the "discharge direction" is set to A. That is, when the heart rate HR of the player is lower than 60, the player character PC discharges, at one pulse timing, one bullet B having an attack power 120 against the enemy characters EC in a discharge direction A. When the heart rate HR is equal to or higher than 60 and is lower than 65, the "number of bullets" is set as two, the "attack power" is set as 60, and the "discharge direction" is set to B. That is, when the heart rate HR of the player is equal to or higher than 60 and is lower than 65, the player character PC discharges, at one pulse timing, two bullets B each having an attack power 60 against the enemy characters EC in the discharge direction B. Further, when the heart rate HR is equal to or higher than 65 and is lower than 70, the "number of bullets to be discharged" is set as three, the "attack power" is set as 40, and the "discharge direction" is set to C. That is, when the heart rate HR of the player is equal to or higher than 65 and is lower than 70, the player character PC discharges, at one pulse timing, three bullets B each having an attack power 40 against the enemy characters EC in the discharge direction C. Further, when the heart rate HR is equal to or higher than 70, the "number of bullets to be discharged" is set as five, the "attack power" is set as 24, and the "discharge direction" is set to D. That is, when the heart rate HR of the player is equal to or higher than 70, the player character PC discharges, at one pulse timing, five bullets B each having an attack power 24 against the enemy character EC in the discharge direction D.

Note that, in the above example of setting of the discharge bullet setting table data Dc, regardless of the value of the heart rate HR of the player, the sum of the attack power of bullets discharged per pulse timing is set to 120. However, another manner of setting may be applicable. For example, the discharge bullet setting table data Dc may be set such that the attack power per pulse timing may be changed in accordance with the heart rate HR of the player. Alternatively, the data may be set such that either of the "number of bullets to be discharged" and the "attack power" may be changed in accordance with the heart rate HR of the player. Still alternatively, at least two of the "discharge directions" described in the discharge bullet setting table data Dc may be set to be a common discharge direction.

The player character position data Dd indicates a position of a player character PC in a virtual game world. The enemy character position data De indicates positions of enemy characters EC in the virtual game world. The bullet object position data Df indicates positions of bullets B in the virtual game world.

The image data Dg includes player character image data Dg1, enemy character image data Dg2, bullet object image data Dg3, and the like. The player character image data Dg1 is data for arranging the player character PC in the virtual game world thereby to generate a game image. The enemy character image data Dg2 is data for arranging the enemy characters EC in the virtual game world thereby to generate a game image. The bullet object image data Dg3 is data for arranging the respective bullets B in the virtual game world thereby to generate a game image.

Figure 15:
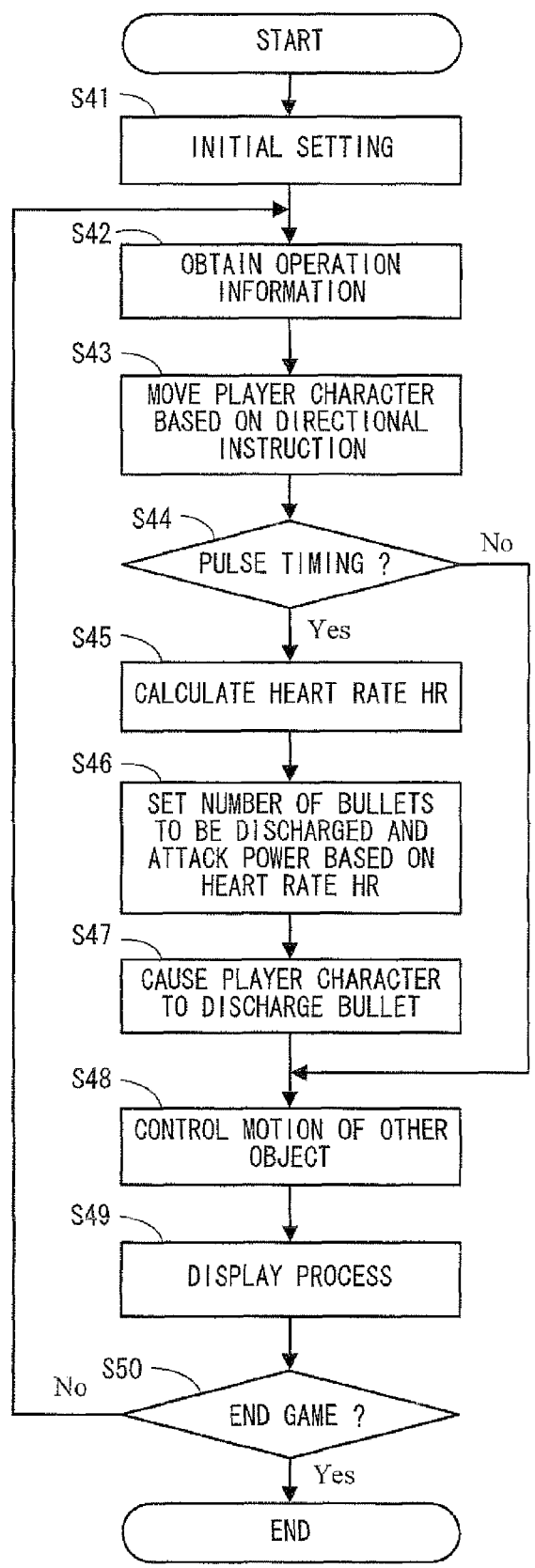
FIG. 15 is a flowchart showing an example of a game process executed on the game apparatus body 5.

Next, the game processing performed on the game apparatus body 5 will be described in detail with reference to FIG. 15. Note that FIG. 15 is a flowchart showing an example of the game processing performed on the game apparatus body 5. Note that, in the flowchart shown in FIG. 15, of the game processing, a process using the biological information from the vital sensor 76 and key data from the core unit 70 will be mainly described, and other game processes which do not directly relate to the present invention will not be described in detail. In FIG. 15, each step executed by the CPU 10 is abbreviated to "S".

When the game apparatus body 5 is powered on, the CPU 10 of the game apparatus body 5 executes a boot program stored in the ROM/RTC 13, thereby initializing each unit such as the main memory or the like. Thereafter, a game program stored in the optical disc 4 is loaded into the main memory, and the CPU 10 starts execution of the game program. The flowchart shown in FIG. 15 indicates game processing which is performed after completion of the aforementioned process.

In FIG. 15, the CPU 10 performs an initial setting of the game processing (step 41), and proceeds to the subsequent step. For example, in the initial setting of the game processing in step 41, the CPU 10 performs initial settings of the virtual game world, the player character PC, the enemy characters EC, and the like. Further, in the initial setting of the game processing in step 41, the CPU 10 initializes respective parameters used in the game processing thereafter.

Next, the CPU 10 obtains data indicating operation information from the core unit 70 (step 42), and proceeds to the subsequent step. For example, the CPU 10 obtains operation information received from the core unit 70, and updates the key data Da1 using details of operations performed on the operation section 72, the details being indicated by the latest key data included in the operation information. Further, the CPU 10 updates the pulse wave data Da2 using a pulse wave signal indicated by the latest biological information data included in the operation information received from the core unit 70.

Next, the CPU 10 moves the player character PC in the virtual game world in accordance with the details of operations performed on the operation section 72, the details being indicated by the key data Da1 (step 43), and proceeds to the subsequent step. For example, when the key data Da1 indicates that the left direction of the cross key 72a has been pressed, the CPU 10 moves the player character PC to the left in the virtual game world by a predetermined distance. Specifically, the CPU 10 moves the position of the player character PC indicated by the player character position data Dd to the left in the virtual game world by a predetermined distance, and updates the player character position data Dd using the moved position of the player character PC. Further, when the key data Da1 indicates that the right direction of the cross key 72a has been pressed, the CPU 10 moves the player character PC to the right in the virtual game world by a predetermined distance. Specifically, the CPU 10 moves the position of the player character PC indicated by the player character position data Dd to the right in the virtual game world by a predetermined distance, and updates the player character position data Dd using the moved position of the player character PC.

Next, the CPU 10 determines whether or not the current moment is the pulse timing (step 44). When the current moment is the pulse timing, the CPU 10 proceeds to subsequent step 45. On the other hand, when the current moment is not the pulse timing, the CPU 10 proceeds to subsequent step 48. For example, in above step 44, the CPU 10 detects a predetermined shape feature point in a pulse wave when referring to a pulse wave signal indicated by the pulse wave data Da2, and determines that the current moment is the pulse timing at which the current moment corresponds to the shape feature point. For example, as the shape feature point, any one point may be selected from among: a point at which the pulse wave represents a local minimum value; a point at which the pulse wave represents a local maximum value; a point at which the contraction rate of the blood vessels represents a maximum value; a point at which the expansion rate of the blood vessels represents a maximum value; a point at which the acceleration of the blood vessel expansion rate represents a maximum value; a point at which the deceleration of the blood vessel expansion rate represents a maximum value; and the like. Any point may be the shape feature point to be determined as the pulse timing.

In step 45, the CPU 10 calculates the heart rate HR of the player, updates the heartbeat data Db, and proceeds to the subsequent step. For example, the CPU 10 refers to the pulse wave signal based on the pulse wave data Da2, and calculates, as the interval of heartbeats at the current moment, a time interval between a pulse timing currently detected in step 44 and the immediately preceding pulse timing (e.g., the R-R interval; see FIG. 9). The CPU 10 then calculates the heart rate HR by dividing 60 seconds by the interval of heartbeats, and updates the heart rate data Db using the newly calculated heart rate HR. Note that when the pulse timing is detected for the first time in the current process, the CPU 10 updates the heart rate data Db using the heart rate HR as a predetermined constant (e.g., 0), for example.

Next, the CPU 10 sets the number of bullets to be discharged and the attack power in accordance with the heart rate HR calculated in above step 45 (step 46). For example, the CPU 10 refers to the discharge bullet setting table data Dc, and extracts a value of the "number of bullets to be discharged" and a value of the "attack power" which correspond to the heart rate HR calculated in step 45. The CPU 10 sets the extracted value of the "number of bullets to be discharged" as the number of bullets B to be discharged at one pulse timing. The CPU 10 also sets the extracted value of the "attack power" as the attack power of each of the bullets B to be discharged.

Next, the CPU 10 performs a process to discharge, from the player character PC, the bullet B set in step 46 in a set discharge direction (step 47), and then proceeds to the subsequent step. For example, the CPU 10 causes the bullet B, the number of which and the attack power of each of which are set in step 46, to appear in the virtual game world, and performs a process of discharging the bullet B in its corresponding discharge direction, the discharge direction being described in the discharge bullet setting table data Dc. Specifically, in above step 47, the CPU 10 causes the bullet to appear at a position of the bullet to be discharged (e.g., the frontmost position of the player character PC, when the player character PC is arranged in the position of the player character PC), the position of the bullets being determined based on the position of the player character PC indicated by the player character position data Dd. The CPU 10 then moves the bullet B from the position of the bullet to be discharged in their corresponding discharge direction.

In step 48, based on a predetermined motion standard, the CPU 10 controls the motion of an other object in the virtual game world, and proceeds to the subsequent step. For example, the CPU 10 causes the enemy characters EC arranged in the virtual game world to move in a predetermined direction by a predetermined moving distance, causes a new enemy character EC to appear in the virtual game world, or causes an enemy character EC to disappear from the virtual game world when the enemy character EC is hit by a bullet B, thereby updating the enemy character position data De in accordance with respective situations. In addition, the CPU 10 moves a bullet B having been discharged in the virtual game world by a predetermined moving distance so as to proceed in the "discharge direction", or causes the bullet B to disappear from the virtual game world when the bullet B has hit the enemy character EC, for example, thereby updating the bullet object position data Df.

Next, the CPU 10 performs a process of displaying on the monitor 2 the virtual game world having the player character PC, the enemy characters EC, the bullet B, and the like arranged therein (step 49), and proceeds to the subsequent step. For example, the CPU 10 arranges the player character PC, the enemy characters EC, the bullet B, and the like in the virtual game world by using the player character position data Dd, the enemy character position data De, the bullet object position data Df, and the image data Dg. The CPU 10 then performs a process of displaying on the monitor 2 a predetermined range of the virtual game world.

Next, the CPU 10 determines whether or not to end the game (step 50). For example, when the condition to be game over is satisfied, or when the player performs an operation to end the game, the game is to be ended. When the game is not to be ended, the CPU 10 returns to step 42 to repeat the processes, whereas when the game is to be ended, the CPU 10 ends the processes in the flowchart.

In this manner, according to the above-described game processing, the bullet B is discharged from the player character PC in accordance with the pulse timing of the player, and thus, a highly entertaining shooting operation that the player cannot easily anticipate can be realized. In addition, the number of bullets B and/or the attack power of each bullet B discharged per pulse timing of the player may be changed based on the heart rate HR of the player, that is, the interval of the pulse timings (interval of heartbeats) of the player, and thus in this case, a further highly entertaining shooting operation that the player cannot easily anticipate can be realized. Further, the discharge direction in which the bullet B is discharged from the player character PC may be also changed based on the interval of the pulse timings (interval of heartbeats) of the player, and thus, in this case as well, a further highly entertaining shooting operation that the player cannot easily anticipate can be realized.

In the above game processing, an example has been described where at least one selected from among: the number of bullets B to be discharged per pulse timing of the player; the attack power of each bullet B; and the discharge direction is changed in accordance with the heart rate HR of the player. However, the change may be made in accordance with other biological information based on the interval of the pulse timings (interval of heartbeats) of the player. For one example, in accordance with the biological information obtained by multiplying the heart rate HR of the player by the amplitude PA of the pulse wave (see FIG. 9), at least one selected from among the number of bullets B to be discharged per pulse timing of the player, the attack power of each bullet B, and the discharge direction may be changed. For another example, in accordance with the pulse wave area PWA obtained from the pulse wave signal of the player (see FIG. 9), at least one selected from among: the number of the bullets B to be discharged per pulse timing of the player; the attack power of each bullet B; and the discharge direction may be changed. In any example, the change is made based on the biological information which is obtained by associating the interval of the pulse timings (interval of heartbeats) of the player with the pulse wave amplitude PA. Thus, the above change may be set variously, and in addition, a game in which the mental state (e.g., difficulties and easiness) of a player affects the change can be realized.

Further, the number of bullets B to be discharged per pulse timing of the player, the attack power of each bullet B, and the discharge direction may be changed depending on various pieces of biological information. For example, the number of bullets B to be discharged per pulse timing of the player and the discharge direction are changed in accordance with any one item selected from among the heart rate HR, the heart rate HR×the pulse wave amplitude P, and the pulse wave area PWA, whereas the attack power of each bullet B is changed in accordance with an other item selected from among the heart rate HR, the heart rate HR×the pulse wave amplitude P, and the pulse wave area PWA. Accordingly, the number of the bullets B to be discharged per pulse timing of the player, the attack power of each bullet B, and the discharge direction are changed in a various manner.

Further, in the above-described example of the discharge bullet setting table data Dc, the number of bullets to be discharged is increased and the attack power of each bullet decreases as the heart rate HR rises. However, the number of bullets B to be discharged and the attack power of each bullet B may be set in a different manner. For example, in the discharge bullet setting table data Dc, the number of bullet to be discharged and the attack power may be set such that the number of bullets to be discharged decreases and the attack power of each bullet increases as the heart rate HR rises. Further, the number of bullets to be discharged and the attack power of each bullet B may be randomly set to correspond to any rise and/or fall range of the heart rate HR.

Figure 16:
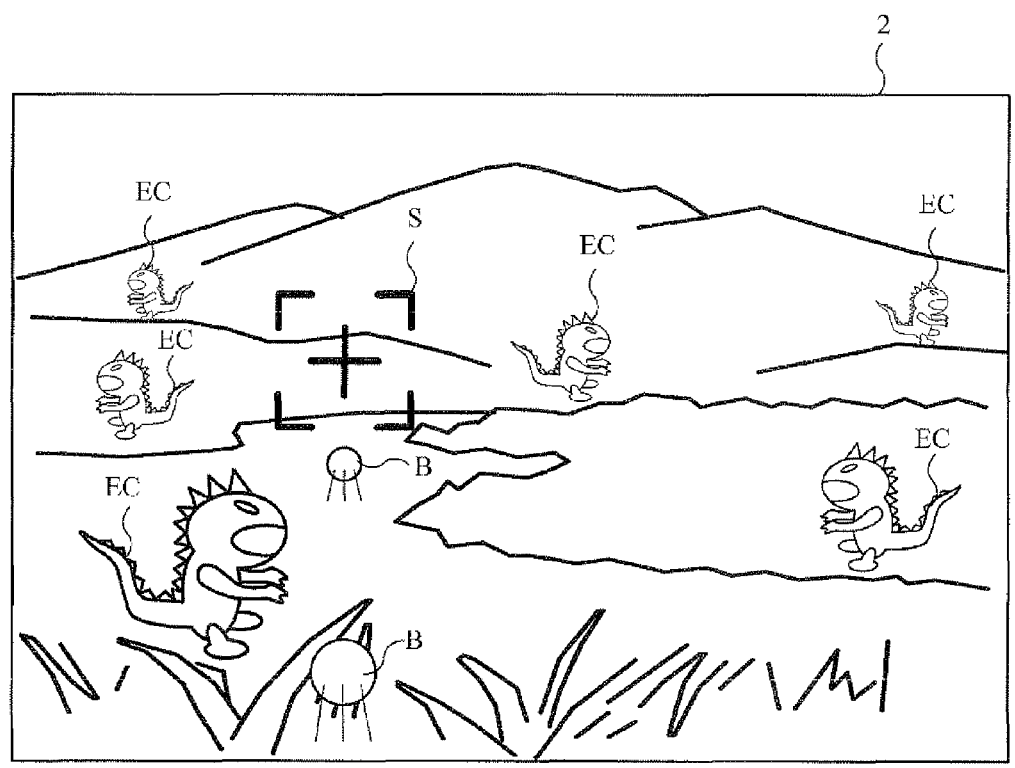
FIG. 16 is a diagram showing an example of a 3-D virtual game space generated based on the point of view of a player character PC.

Further, in the above description referring to FIG. 10 to FIG. 12, a shooting game has been introduced where a player character PC and enemy characters EC are arranged in the two-dimensional virtual game world and the player character PC discharges a bullet B to hit the enemy characters EC. The present invention is also applicable to a game of another type. For example, the present invention is applicable to a shooting game where an enemy character EC is arranged in a three-dimensional virtual game world and a player character PC discharges a bullet to hit the enemy character EC. In this case, the present invention may be applicable to a game generated based on a first-person point of view, that is, the point of view of the player character PC. For example, as shown in FIG. 16, on the monitor 2, the enemy characters EC arranged in a three-dimensional virtual game space are displayed based on the point of view of the player character PC, and a shooting aim S of the player character PC is also displayed. At the pulse timing of the player, a bullet B is discharged while the direction indicated by the shooting aim S is set as the reference. In this case, the player moves the position of the shooting aim S by pressing any of the front, rear, left, and right directions of the cross key 72a provided on the core unit 70, and causes the player character PC to stay at a fixed position in the virtual game space, or to automatically move in the virtual game space in accordance with a predetermined moving reference.

Further, in the above-described example of the game, the player moves the player character PC or the shooting aim S by operating the operation section 72 of the core unit 70. Alternatively, it may be possible for the player to move the player character PC or the shooting aim S by using data outputted from the sensor fixedly provided in the core unit 70. For example, it may be possible to provide the core unit 70 with: a sensor (the acceleration sensor 701 or a tilt sensor) which outputs data corresponding to the tilt of the core unit 70 relative to the direction of gravity (hereinafter simply referred to as a "tilt"); a sensor (magnetic sensor) which outputs data corresponding to an orientation of the core unit 70; a sensor (gyro-sensor) which outputs data corresponding to rotational motion of the core unit 70; and the like, whereby the data outputted from the sensor is used. In this case, the player character PC or the shooting aim S may be moved in accordance with the motion or tilt of the core unit 70 which is identifiable by using the above-described data. Further, a camera fixed to the core unit 70 (e.g., the imaging information calculation section 74) may be used as the sensor. In this case, since an image taken by the camera changes depending on the position pointed to by the core unit 70, analysis of this image enables calculation of the position pointed to by the core unit 70, and thus it is possible to move the player character PC or the shooting aim S to the pointed to position.

Further, some of the above sensors may be arranged independently outside the core unit 70. As an example, the whole of the core unit 70 is taken by a camera functioning as the sensor from outside the core unit 70, and the image of the core unit 70 captured in the taken image is analyzed, whereby the motion, tilt, pointing-to position of the core unit 70 can be identified. Alternatively, a system may be used in which a unit fixed to the core unit 70 is used in combination with a unit arranged independently outside the core unit 70. As an example of this case, a light emitting unit is arranged independently outside the core unit 70, and the light emitted from the light emitting unit is taken by using a camera fixed to the core unit 70. The image taken by the camera is analyzed, whereby the motion, tilt, and pointing-to position of the core unit 70 are identified. Further alternatively, a system may be used in which a magnetic field generation device is arranged independently outside the core unit 70, and a magnetic sensor is fixedly mounted in the core unit 70.

Further, when the sensor may be arranged independently outside the core unit 70, it is not necessary to use the core unit 70. For example, a player is taken by a camera functioning as the sensor, and the image of the player captured in the taken image is analyzed, whereby the motion or the posture of the player is identified, and the player character PC or the shooting aim S is moved in accordance with the identification result. Alternatively, a sensor provided to an input device, which is operated by a player stepping thereon (e.g., a board type controller), is used, the sensor detecting weight applied on the input device or any object placed on the input device, so that the motion or posture of the player operating the input device is identified, whereby the player character PC or the shooting aim S is moved in accordance with the identification result. When any of the sensors of the above-described types is used to move the player character PC or the shooting aim S, the core unit 70 need not be used.

Further, in the description above, a site of the player's body (e.g., a finger tip) is irradiated with infrared light, and a biological signal (pulse wave signal) of the player is obtained based on the amount of infrared light which is transmitted and received through the site of the body. That is, a change in volume of blood vessels is detected based on a so-called optical method thereby to obtain a volume pulse wave. Alternatively, in the present invention, the biological signal of the player may be obtained by using sensors of other types which obtain physiological information which occurs when the player performs physical activities. For example, the biological signal of the player may be obtained by detecting a change in pressure in blood vessels due to pulsation of the arterial system thereby to obtain a pressure pulse wave (e.g., a piezoelectric method). Alternatively, a muscle potential or a heart potential of the player may be obtained as the biological information of the player. The muscle potential or the heart potential can be detected by a commonly used method employing electrodes. For example, based on a minute change in current in the player's body, the biological signal of the player can be obtained. Alternatively, a blood flow of the player may be obtained as the biological information of the player. The blood flow is measured as a pulsating blood flow per heartbeat by using an electromagnetic method, an ultrasound method, or the like, whereby the pulsating blood flow is obtained as the biological signal of the player. A vital sensor may be attached to a site (e.g., a chest, an arm, an ear lobe, etc.) other than a finger portion of the player so as to obtain various biological signals described above. Strictly speaking, there may be a difference between the pulse and the heartbeat depending on the obtained biological signal. However, a heart rate and a pulse rate are considered to be substantially equal to each other, and therefore, the obtained biological signal can be processed in a manner similar to that of the aforementioned process. Accordingly, the game apparatus body 5, which detects the pulse timing of a player by using peaks and dips of the pulse wave indicated by the pulse wave data obtained from the vital sensor 76, actually detects the heartbeat or pulse of the player wearing the vital sensor 76, and thus, the pulse timing can be used as the heartbeat or the pulse in a similar manner.

Further, in the description above, the vital sensor 76 transmits data indicating a pulse wave signal the game apparatus body 5, in which various parameters are calculated from the pulse wave signal. Alternatively, data in other process steps may be transmitted to the game apparatus body 5. For example, the vital sensor 76 may calculate any of parameters indicating: detection of the pulse timing; the interval of pulse timings (interval of heartbeats); the heart rate HR; the pulse wave amplitude PA; and the pulse wave area PWA, and transmit data indicating the parameters to the game apparatus body 5. Alternatively, data halfway through calculation of the parameters from the pulse wave signal may be transmitted from the vital sensor 76 to the game apparatus body 5.

Further, in the description above, the game processing is performed by using the controller 7 (vital sensor 76, core unit 70) and the game apparatus body 5 (i.e., the game apparatus 3). Alternatively, at least some of process steps in the above game processing may be performed by using an other apparatus. For example, when the game apparatus 3 is configured to be communicable with an other apparatus (e.g., a server), process steps in the game processing may be performed by using the game apparatus 3 and the other apparatus in a combined manner. For example, when a virtual game world is set by the other apparatus, a case may be considered where: a pulse wave signal outputted from the vital sensor 76 and key data outputted from the core unit 70 is transmitted to the other apparatus; the game processing thereafter is performed on the other apparatus; and then a display process is performed on the game apparatus 3. For another example, when a virtual game world is set by the other apparatus, a case may be considered where: data halfway through the game processing (e.g., data indicating the interval of pulse timings (such as the heart rate HR), position data of a player character PC or a shooting aim S, and data relating to a discharged bullet B) is transmitted from the game apparatus 3 to the other apparatus; the process using the transmitted data is performed on the other apparatus; and then a display process is performed on the game apparatus 3. In this manner, by performing at least some of the process steps in the game processing on the other apparatus, a game processing similar to that described above can be realized. In addition, the present invention can be applied to game processing which allows a plurality of players playing with individual game apparatuses to join a virtual game world realized on the other apparatus (e.g., an on-line game which is operated on the other apparatus and is joined and shared by a plurality of players playing with the individual game apparatuses).

Note that, in this specification, the terms "game system" and "computer system" include: a system such as the game system 1 which comprises the game apparatus 3 including the optical disc 4, the game apparatus body 5, and the controller 7, and the monitor 2; and a computer system of a standalone type; and further includes a portable system which is realized by including these functions in one apparatus. Further, in this specification, the terms "game system" and "computer system" include: a system in which a plurality of game apparatuses are communicably connected to each other in a wired or wireless manner; and a system in which at least one game apparatus and an other apparatus (e.g., a server) are communicably connected to each other in a wired or wireless manner. Further, in this specification, the terms "game system" and "computer system" include, for example, a system that is configured with one apparatus such as the above game apparatus body 5 or the like, and also includes a so-called computer system that is configured with one apparatus which includes a CPU, a main storage unit, and the like.

Further, in the examples above, the present invention is applied to the stationary game apparatus 3. The present invention is also applicable to any apparatus that includes at least a vital sensor, an input device to which operations by the player is inputted, and an information processing device for executing a process depending on information obtained from the sensor and the device. For example the present invention is applicable to a commonly used personal computer, a mobile phone, a Personal Digital Assistant (PDA), a hand-held game apparatus, and the like.

Further, in the description above, the core unit 70 and the game apparatus body 5 are connected by wireless communication. Alternatively, the core unit 70 and the game apparatus body 5 may be electrically connected via a cable. In this case, a cable connected to the core unit 70 is connected to a connection terminal of the game apparatus body 5.

Further, of the core unit 70 and the vital sensor 76 constituting the controller 7, only the core unit 70 is provided with the communication section 75. Alternatively, the vital sensor 76 may be provided with the communication section which wirelessly transmits biological information data to the game apparatus body 5. Alternatively, each of the core unit 70 and the vital sensor 76 may be provided with the communication section. For example, the communication sections provided in the core unit 70 and the vital sensor 76 may each wirelessly transmit biological information data or operation data to the game apparatus body 5. Alternatively, the communication section of the vital sensor 76 may wirelessly transmit biological information data to the core unit 70, and the communication section 75 of the core unit 70 may receive it. And thereafter, the communication section 75 of the core unit 70 may wirelessly transmit, to the game apparatus body 5, operation data of the core unit 70 along with the biological information data of the vital sensor 76. In these cases, the connection cable 79 for electrically connecting the core unit 70 and the vital sensor 76 is no longer required.

Further, the shape of the core unit 70, and the shape, number, and arrangement or the like of the operation section 72 arranged thereon, which are described above, are merely examples. Even in the case of other shapes, numbers, arrangements, and the like, the present invention can be achieved. Further, the shape of the vital sensor 76, and the types, numbers, arrangements, and the like of the components provided therein, which are described above, are also merely examples. Even in the case of other types, numbers, arrangements, and the like, the present invention can be achieved. Further, the coefficients, criteria, expressions, processing orders, and the like used in the above-described processes are also merely examples. Even in the case of other values, expressions, processing orders, the present invention can be achieved.

Further, the above-described game program may be supplied to the game apparatus body 5 not only from an external storage medium, such as the optical disc 4 or the like, but also via a wireless or wired communication line. Further, the game program may be previously stored in a non-volatile storage device of the game apparatus body 5. Examples of the information storage medium having the game program stored therein include a flexible disk, a hard disk, a magnetic optical disk, a magnetic tape, and a non-volatile memory in addition to a CD-ROM, a DVD, and any other optical disc-shaped storage medium similar to those. Further, as the information storage medium storing therein the game program, a volatile memory which stores the game program temporarily may be used.

While the present invention has been described in detail, the foregoing description is in all aspects illustrative and not restrictive. It is understood that numerous other modifications and variations can be devised without departing from the scope of the invention. It is should be understood that the scope of the present invention is interpreted only by the scope of the claims. It is also understood that, from the description of specific embodiments of the present invention, the one skilled in the art can easily implement the present invention in the equivalent range based on the description of the present invention and on the common technological knowledge. Further, throughout the specification, it is understood that terms in singular form should include a concept of plurality. Thus, it should be understood that articles or adjectives indicating the singular form (e.g., "a", "an", "the", and the like in English) includes the concept of plurality unless otherwise specified. Further it should be understood that terms used in the present specification have meanings generally used in the art concerned unless otherwise specified. Therefore, unless otherwise defined, all the jargons and technical terms have the same meanings as those generally understood by one skilled in the art of the present invention. In the event of any conflicition, the present specification (including meanings defined herein) has priority.

A storage medium having a game program stored therein, a game apparatus, a control method, and a game system according to the present invention can realize a highly entertaining operation which the player cannot easily anticipate, and are useful as a game program, a game apparatus, a control method, a game system, and the like which enables game progress using biological information of a player.

What is claimed is:

1. A non-transitory computer readable storage medium having stored therein a game program executed by a computer of a game apparatus performing game processing to cause a player object to perform in a virtual game world in accordance with information corresponding to a biological signal acquired from a player, the game program causing the computer to execute instructions comprising:
    acquiring the biological signal from the player corresponding to a blood pulse related to contractions of a heart of the player;
    detecting the blood pulse or heartbeat of the player in accordance with the acquired biological signal;
    calculating, based on the acquired biological signal, an interval of detection of the blood pulse or the heartbeat of the player; and
    causing the player object to perform a motion of discharging at least one discharge object, from a plurality of types of discharge objects, in the virtual game world when the pulse or the heartbeat is detected, the plurality of types of discharge objects having different configurations defined for the at least one discharge object, and a configuration of one of the plurality of types of discharge objects being discharged is changed in accordance with the calculated interval of detection.

2. The non-transitory computer readable storage medium having stored therein the game program according to claim 1, the game program further causing the computer to execute instructions comprising:
    causing a target object, which is a target to be hit by a discharge object, to appear in the virtual game world, wherein when one of the at least one discharge object has hit the target object, an effect of the one of the at least one discharge object exerted on the target object is changed in accordance with the calculated interval of detection.

3. The non-transitory computer readable storage medium having stored therein the game program according to claim 1, wherein a number of the at least one discharge object to be discharged when the player object performs one discharging motion is changed in accordance with the calculated interval of detection.

4. The non-transitory computer readable storage medium having stored therein the game program according to claim 3, the game program further causing the computer to execute instructions comprising:
    causing a target object, which is a target to be hit by the at least one discharge object, to appear in the virtual game world, wherein when one of the at least one discharge object has hit the target object, an effect of the one of the at least one discharge object exerted on the target object is changed in accordance with the calculated interval of detection.

5. The non-transitory computer readable storage medium having stored therein the game program according to claim 4, wherein when one of the at least one discharge object has hit the target object, the higher a number of the at least one discharge object discharged, the lower an effect of the one of the at least one discharge object exerted on the target object.

6. The non-transitory computer readable storage medium having stored therein the game program according to claim 3, wherein a direction in which the at least one discharge object is to be discharged when the player object performs one discharging motion corresponds to the number of objects of the at least one discharge object discharged in one discharging motion.

7. The non-transitory computer readable storage medium having stored therein the game program according to claim 2, wherein when one of the at least one discharge object has hit the target object, the effect of the one of the at least one discharge object exerted on the target object corresponds to a size of the calculated interval of detection.

8. The non-transitory computer readable storage medium having stored therein the game program according to claim 1, wherein a first parameter and a second parameter which relate to the at least one discharge object are set in accordance with the calculated interval of detection.

9. The non-transitory computer readable storage medium having stored therein the game program according to claim 8, wherein when the calculated interval of detection increases, the first parameter decreases in value while the second parameter increases in value, whereas when the calculated interval of detection decreases, the first parameter increases in value while the second parameter decreases in value.

10. The non-transitory computer readable storage medium having stored therein the game program according to claim 1, the game program further causing the computer to execute instructions comprising:
    acquiring an operation input performed by the player on an input device, wherein the player object performs in accordance with the acquired operation input.

11. The non-transitory computer readable storage medium having stored therein the game program according to claim 1, the game program further causing the computer to execute instructions comprising:
    acquiring an operation input performed by the player on an input device, wherein a direction in which the at least one discharge object is to be discharged from the player object corresponds to the acquired operation input.

12. The non-transitory computer readable storage medium having stored therein the game program according to claim 1, wherein the biological signal is acquired as a signal relating to a blood pulse wave or the heartbeat of the player, and the pulse or the heartbeat of the player is detected as a timing at which the signal relating to the acquired pulse wave or the heartbeat indicates a local minimum value or a local maximum value.

13. The non-transitory computer readable storage medium having stored therein the game program according to claim 1, wherein the biological signal is acquired as a signal relating to a blood pulse wave or the heartbeat of the player, and the pulse or the heartbeat of the player is detected as a timing at which a contraction rate or an expansion rate of blood vessels reaches a maximum value in the signal relating to the acquired pulse wave or the acquired heartbeat.

14. The non-transitory computer readable storage medium having stored therein the game program according to claim 1, wherein the biological signal is acquired as a signal relating to a blood pulse wave or the heartbeat of the player, and the pulse or the heartbeat of the player is detected as a timing at which contraction acceleration or expansion acceleration of blood vessels reaches a maximum value in the signal relating to the acquired pulse wave or the acquired heartbeat.

15. A game apparatus performing game processing to cause a player object to perform in a virtual game world in accordance with information corresponding to a biological signal acquired from a player, the apparatus comprising:
a biological signal acquisition unit for acquiring the biological signal from the player corresponding to a blood pulse related to contractions of a heart of the player;
a pulse detection unit for detecting the blood pulse or heartbeat of the player in accordance with the biological signal acquired by the biological signal acquisition unit;
an interval of detection unit for calculating, based on the acquired biological signal, an interval of detection of the blood pulse or the heartbeat of the player; and
a player object motion control unit for causing the player object to perform a motion of discharging at least one discharge object, from a plurality of types of discharge objects, in the virtual game world when the pulse detection unit detects the pulse or the heartbeat, the plurality of types of discharge objects having different configurations defined for the at least one discharge object, and a configuration of one of the plurality of types of discharge objects being discharged is changed in accordance with the calculated interval of detection.

16. A control method in an information processing system including at least one information processing device, the method comprising:
acquiring a biological signal from a user corresponding to a blood pulse related to contractions of a heart of the user;
detecting the blood pulse or heartbeat of the user in accordance with the biological signal;
calculating, based on the acquired biological signal, an interval of detection of the blood pulse or the heartbeat of the player; and
causing a user object to perform a motion of discharging at least one discharge object, from a plurality of types of discharge objects, in the virtual game world when the pulse or the heartbeat is detected, the plurality of types of discharge objects having different configurations defined for the at least one discharge object, and a configuration of one of the plurality of types of discharge objects being discharged is changed in accordance with the calculated interval of detection.

17. A game system which includes a plurality devices communicably connected to each other, and performs game processing to cause a player object to perform a motion in a virtual game world in accordance with information corresponding to a biological signal acquired from a player, the system comprising:
a biological signal acquisition unit for acquiring a biological signal from the player corresponding to a blood pulse related to contractions of a heart of the player;
a pulse detection unit for detecting the blood pulse or heartbeat of the player in accordance with the biological signal acquired by the biological signal acquisition unit;
an interval of detection unit for calculating, based on the acquired biological signal, an interval of detection of the blood pulse or the heartbeat of the player; and
a player object motion control unit for causing the player object to perform a motion of discharging at least one discharge object, from a plurality of types of discharge objects, in the virtual game world when the pulse detection unit detects the pulse or the heartbeat, the plurality of types of discharge objects having different configurations defined for the at least one discharge object, and a configuration of one of the plurality of types of discharge objects being discharged is changed in accordance with the calculated interval of detection.

18. The non-transitory computer readable storage medium having stored therein the game program according to claim 1, wherein the blood pulse corresponds to a throbbing of arteries in the player produced by contractions of the heart of the player as palpated, discerned, or detected at a specific body site.

19. The non-transitory computer readable storage medium having stored therein the game program according to claim 1, wherein a number, a movement direction, and a damage amount of the at least one discharge object correspond to the calculated interval of detection of the pulse or the heartbeat of the player.

20. A non-transitory computer readable storage medium having stored therein a program, executed by an information processing device, for causing a player object to perform in a virtual game world in accordance with information corresponding to a biological signal acquired from a player, the game program causing the computer to perform functionality comprising:
detecting a blood pulse or a heartbeat of a player based on an acquired biological signal of the player;
calculating an interval of detection of the blood pulse or the heartbeat of the player based on the acquired biological signal;
discharging, from the player character in the virtual game world, one or more discharge objects based on the detected pulse or heartbeat; and
varying an amount, a direction, and a performance type of the one or more discharge objects in accordance with the calculated interval of detection.

* * * * *